United States Patent
Takaragi et al.

(10) Patent No.: US 6,621,922 B2
(45) Date of Patent: *Sep. 16, 2003

(54) IMAGE PROCESSING SYSTEM AND ELECTRONIC APPARATUSES

(75) Inventors: Yoichi Takaragi, Yokohama (JP); Akiko Kanno, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 08/281,009

(22) Filed: Jul. 27, 1994

(65) Prior Publication Data

US 2002/0097420 A1 Jul. 25, 2002

(30) Foreign Application Priority Data

Jul. 30, 1993 (JP) .............................. 5-190091
Jan. 18, 1994 (JP) .............................. 6-003620

(51) Int. Cl.[7] ................................ G06K 9/00
(52) U.S. Cl. ...................... 382/162; 382/135
(58) Field of Search ................. 355/201, 133, 355/40; 358/404, 405, 406, 434, 435, 437, 441, 500, 504, 518; 380/10, 18

(56) References Cited

U.S. PATENT DOCUMENTS

| 3,713,861 | A | * | 1/1973 | Sharp ....................... 117/15 |
| 3,859,508 | A | * | 1/1975 | Brosow | |
| 4,270,146 | A | * | 5/1981 | Adachi ...................... 358/450 |
| 4,924,328 | A | * | 5/1990 | Endoh et al. ................ 368/60 |
| 5,001,750 | A | * | 3/1991 | Kato et al. .................. 380/10 |
| 5,227,871 | A | | 7/1993 | Funada et al. ............... 358/75 |
| 5,335,292 | A | * | 8/1994 | Lovelady ..................... 382/17 |
| 5,363,202 | A | * | 11/1994 | Udagawa ..................... 358/501 |

FOREIGN PATENT DOCUMENTS

| EP | 0342060 | 11/1989 | .......... G03G/15/01 |
| EP | 0506332 | 9/1992 | .......... G06K/15/00 |
| JP | 4-10862 | 1/1992 | .......... H04N/1/32 |
| JP | 5-244412 | 9/1993 | .......... H04N/1/40 |

OTHER PUBLICATIONS

Cecil & Hobgood; Secure Document Feature For Copy Machines; IBM Disc. vol. 15 No. 9 Feb. 1973, 2736–37.*
Hildenbrandt; "Document Security for Copiers"; IBM Disc, vol. 19 No. 9; Feb. 77; 3293–94.*
Weinberg; "Document Copying Inhibitor Method"; IBM Disc. vol. 17 No. 12 May 1975; p. 1.*
Hobgood; "Secure Document Feature For Copy Machines"; IBM Disc; vol. 15 No. 2; Jul. 72 p. 453–54.*
Boggs and Ernst; "Copier Incorporating Document Detection System" IBM Disc; vol. 15 No. 7; Dec. 72; p. 2231.*
Bacon and Hildenbrandt; "Secure Document Feature For Copy Machines"; IBM Disc; vol. 18; No. 4; Sep. 1975.*
Galli and Metz; "Copier Security System"; IBM Disc; vol. 18; No. 3 Aug. 1975; p. 912–13.*
Telcom Report, vol. 7, No. 5, pp. 305–309 (1984).

* cited by examiner

Primary Examiner—Jerome Grant, II
(74) Attorney, Agent, or Firm—Fitzpatrick, Cella, Harper & Scinto

(57) ABSTRACT

An image processing system is capable of establishing that identification information is added to print includes a detector for detecting whether a printer will add identification information to printed matter when transferring image data from an electronic apparatus which processes the image data to the printer, to ensure the positive addition of the identification information to the printed matter.

46 Claims, 22 Drawing Sheets

FIG. 4

PRINTER IS INOPERABLE.

PLEASE TURN OFF POWER SUPPLY SWITCH.

FIG. 11

IMAGE SCANNER IS INOPERABLE.

PLEASE TURN OFF POWER SUPPLY SWITCH.

IMAGE PROCESSING SYSTEM AND ELECTRONIC APPARATUSES

BACKGROUND OF THE INVENTION

1. Field of the Invention

The present invention relates to an image processing system and an electronic apparatus which are respectively an image processing system comprising an image processing device and an electronic apparatus for transmitting and receiving image data and an electronic apparatus which transmits and receives image data to/from the image processing device, whereby the image processing device is authenticated by the electronic apparatus.

2. Related Background Art

Lately along with a remarkable improvement color copying machines and color printers, there have been reported crimes of counterfeiting bank notes and securities by illegally using these color copying machines and color printers.

To prevent these crimes, therefore, there has been proposed a technology for adding to an image print information which permits one to specify a serial number of the copying machine used, and a technology for detecting a specified original and preventing this specified original from being copied.

However, conventional printers have not been furnished with means capable of accurately detecting whether a function for adding the identification information is provided.

Accordingly, for transferring image data from electronic equipment such as an image scanner and a computer to a printer and printing the image data, it has not always been guaranteed that the identification information is added to the printed copies. When reading the original on the image input device and outputting the image from this image data input device, it has not been able to certify at the image output device that the image input device provides the function to determine the specified original.

Therefore, when printing image data transferred from the image input device to the image output device, it has not always been guaranteed that the specified original is identified at the image input device and that output of image data is controlled.

In addition, both image input and output devices could not certify that they are respectively provided with the specified original detecting function and the identification code addition function.

SUMMARY OF THE INVENTION

It is an object of the present invention to provide an image processing system and an electronic apparatus for solving the above problems.

It is another object of the invention to provide an image processing system capable of certainly certifying an image forming device and an image input device and an electronic device, which are respectively provided with specified functions, and an electronic apparatus.

A preferable embodiment of the present invention for attaining the above objects is an image processing system for transferring image data from an electronic apparatus to an image forming device comprising:

an electronic apparatus including:
 certifying means for certifying whether the image forming device has a function for adding identification information to a formed image according to data received from the image forming device, and
 transfer means for transferring the image data to the image forming device according to the result of the certification by means of the certifying means; and an image forming device including:
 receiving means for receiving image data from the electronic apparatus, and
 adding means for adding the identification information to the image data received.

In addition, it is a further another object of the invention to provide an image processing system, which certifies an image forming device and an image input device by an indecipherable and safe certifying method, and an electronic apparatus.

It is a further another object of the invention to provide an image processing system including a processing part for which an illegal modification is difficult, and an electronic apparatus.

It is a further another object of the invention to provide an image processing system and an electronic apparatus which respectively have novel functions.

Other objects and features of the present invention will be obvious from the description of the embodiments and drawings shown in the following sheets.

BRIEF DESCRIPTION OF THE DRAWINGS

FIG. 4 is an error message display of an image scanner 201 according to the first embodiment;

FIG. 11 is a display showing an error message in the third embodiment;

DETAILED DESCRIPTION OF THE PREFERRED EMBODIMENTS

The present invention is described in detail, referring to the preferred embodiments.

Though an example of a copying machine is described as an application example of the present invention in the following embodiments, the present invention is not limited to this application example and can apply to other various types of equipment.

Figure 1:
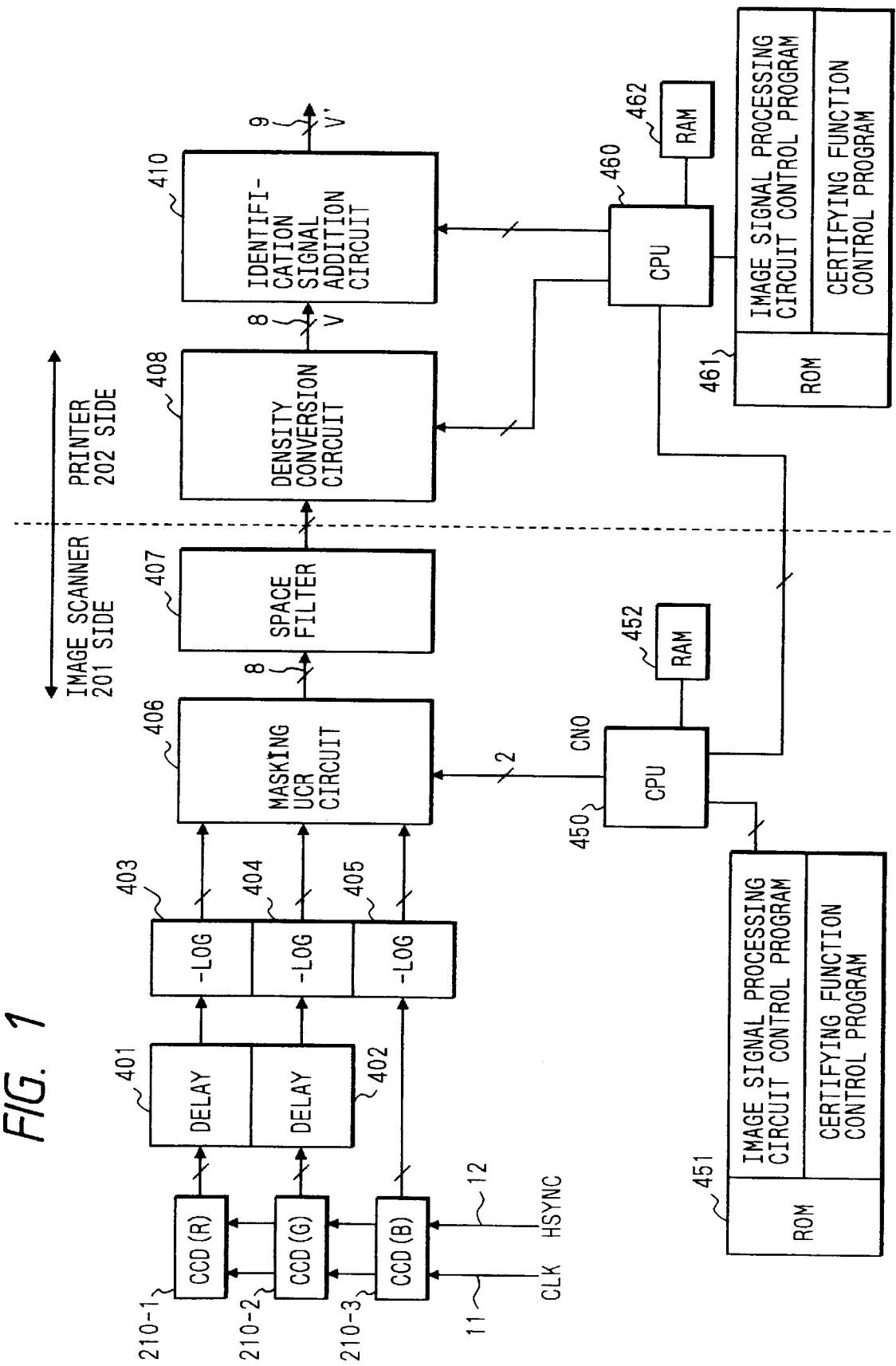
FIG. 1 is a block diagram showing the flow of signals through an image scanner 201 and a printer 202.

FIG. 1 shows a block diagram showing a signal flow in an image scanner 201 and a printer 202.

In FIG. 1, reference numerals 210-1, 210-2 and 210-3 respectively denote CCD (charge coupled device) sensors each having spectral sensitivity characteristics for red (R), green (G) and blue (B), and the image data is outputted as 8-bit output signals 0 to 255 after having been A/D converted.

Those sensors 210-1, 210-2 and 210-3 used in this embodiment are equidistantly arranged and therefore a spatial deviation is corrected by means of delay devices 401 and 402.

Reference numerals 403, 404 and 405 are respectively logarithmic converters, each comprising a look-up table ROM or RAM, which convert luminance signals to density signals. 406 is a known masking UCR (under color removal) circuit for which a detailed description is omitted. The masking UCR circuit 406 outputs image data having a specified bit length such as, for example, 8 bits in plane sequence each time each signal of magenta (M), cyan (C), yellow (Y) and black (Bk) is read according to three signals entered.

In this case, a CNO signal is a 2-bit plane sequential signal which designates an output color of color image data to be outputted in the plane sequence by the masking UCR circuit 406 and also a control signal for outputting 2-plane sequential color image signals in accordance with the sequence of transfer operations four times as shown in Table 1, thereby changing over the operating condition of the masking/UCR circuit 406.

TABLE 1

| CNO signal | print output |
| --- | --- |
| 0 | Magenta (M) |
| 1 | Cyan (C) |
| 2 | Yellow (Y) |
| 3 | Black (Bk) |

407 denotes a known space filter circuit which corrects a space frequency of the output signal. 408 is a density conversion circuit which corrects color image signals entered from the image scanner in accordance with a density characteristic of a printing part 202 and comprises ROMs or RAMs similar to the logarithmic converters 403 to 405.

410 is an identification signal addition circuit described later in FIG. 5. This circuit enables to add the identification information such as a serial number of the printer in a color of light yellow to a copied output and therefore, if a full-color copying machine is illegally used to copy specified images such as bank notes, the machine used can be specified.

450 is a microprocessor which carries out processing of image signals of the image scanner 201 and certification processing of the printer. As in the present circuit configuration, in a case that an improvement of the certification processing, such as stopping the supply of clock signals to the microprocessor 450, is performed by carrying out the control of the image signal processing circuit and certification processing of the printer in the same microprocessor, the control function of the image signal processing circuit does not operate and a strength of the equipment for vicious modification can be increased.

ROM 451 is a read only memory in which a program of the microprocessor 450 is stored.

RAM 452 is a random access memory used as a work area by the microprocessor 450.

A microprocessor 460 carries out image signal processing and certification processing of the printer 202. Like the microprocessor 450, the strength of the equipment for improvement can also be increased by carrying out the control and certification processing of the image signal processing circuit in the same microprocessor.

ROM 461 and RAM 462, as ROM 451 and RAM 452, are respectively a read only memory which stores the program of the microprocessor 460 and a random access memory used as a work area by the microprocessor 460.

(Outline of the Equipment)

Figure 2:
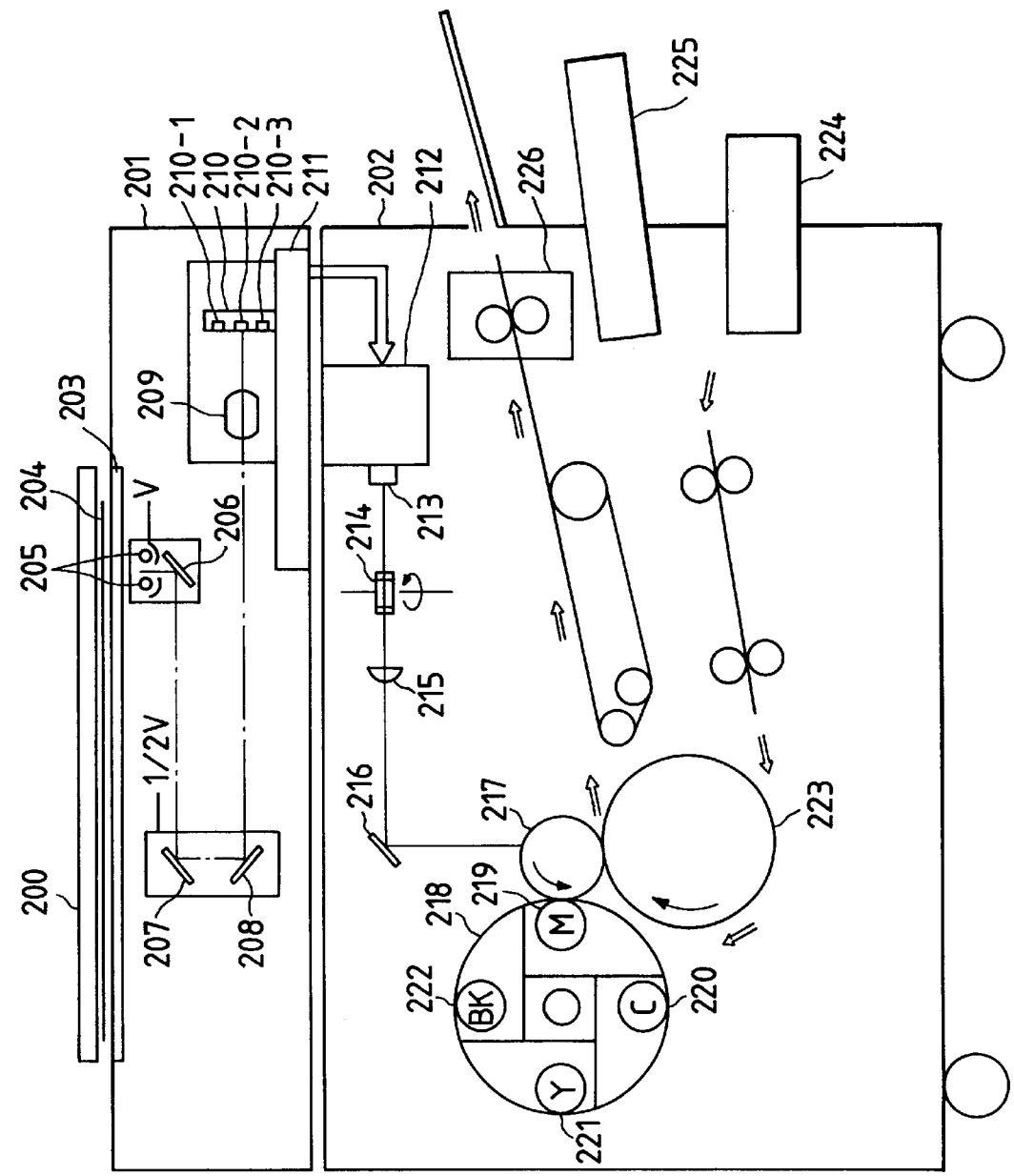
FIG. 2 is a schematic diagram of an apparatus according to a first embodiment of the present invention.

A schematic diagram of a first embodiment of the present invention is shown in FIG. 2. In FIG. 2, 201 is an image scanner which reads the original and processes digital signals. 202 is a printing part which prints out an image corresponding to the original image read by the image scanner 201 on a printing paper in full color.

In the image scanner 201, 200 is a mirror surface impression plate, and an original 204 on an original rest glass (hereafter referred to as the "platen") is irradiated by a lamp 205, an irradiated light is guided to mirrors 206, 207 and 208, focused on a 3-line sensor (hereafter referred to as the "CCD") 210 by a lens 209 and sent to a signal processing part 211 as red (R), green (G) and blue (B) components of full color information. The whole surface of the original is scanned (sub-scan) by 205 and 206, which mechanically move at a speed v, and 207 and 208, which also mechanically move at a speed ½v, respectively in a direction perpendicular to an electrical scanning direction (main scanning) of the line sensor, and the image signals are transferred to the signal processing part 211.

In the signal processing part 211, image signals R, G and B, which have been read, are electrically processed after having been temporarily stored in the image memory (not shown), converted to magenta (M), cyan (C), yellow (Y) and black (Bk) color components and sent in plane sequence to the printing part 202. Read-out operation from the above-described image scanner (not shown) is carried out four times with respect to the image data of the original which has been read in one scanning operation by the image scanner 201, one of color components M, C, Y and Bk is generated in image processing and sent to the printing part in plane sequence, and thus one print-out operation is completed through reading and processing carried out four times.

Image signals of M, C, Y and Bk sent from the image scanner 201 are sent to a laser driver 212. The laser driver 212 modulation-drives a semiconductor laser 213 in response to the sent image signals. The laser beam scans the surface of a photosensitive drum 217 through a polygon mirror 214, a f-θ lens 215 and a mirror 216.

218 is a rotary developer which comprises a magenta developing part 222, a cyan developing part 220, a yellow developing part 221 and a black developing part 222, and these four developing parts alternately contact the photosensitive drum 217 and develop a static image formed on the photosensitive drum with a toner.

223 is a transfer drum which takes up a paper form to be supplied from a paper cassette 224 or 225 around it and transfers an image developed on the photosensitive drum onto paper.

After four colors M, C, Y and Bk have been thus transferred in sequence, the paper passes through a fixing unit 226, the toner is fixed to the paper and the paper is ejected.

Figure 3:
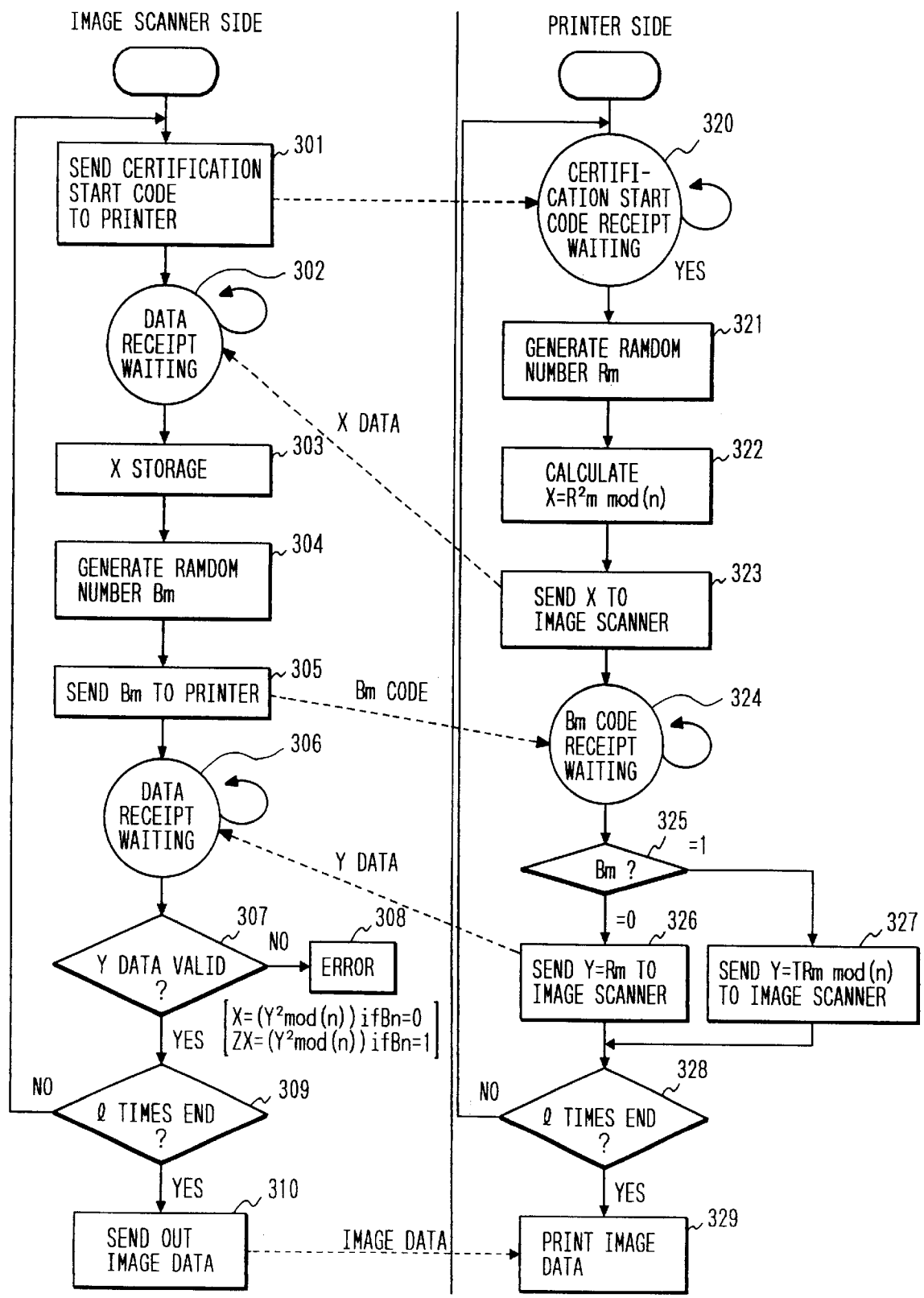
FIG. 3 is a flow chart of the first embodiment.

FIG. 3 is a flow chart illustrating the processing of the image scanner which certifies that the printer 202 is provided with the identification signal addition function.

In this processing, only the printer having the identification signal addition function identifies confidential information T, which has been maintained, through the image scanner and implements the certification function.

In this case, the fact that the printer 202 is maintaining the confidential information T can be checked by a method called "zero-knowledge interactive proof" without loading the confidential information T on the transmission channel and therefore safe certification can be realized.

In FIG. 3, 301 to 310 represent steps of a flow chart related to the operation of the microprocessor 450 of the image scanner 201.

320 to 329 represent steps of a flow chart related to the operation of the microprocessor 460 of the printer 202.

At 310, the microprocessor 460 sends out the certification start code (for example, ESC code) to the microprocessor 460.

When the microprocessor 460 receives the certification start code, the microprocessor generates a random number Rm at 321, calculates $X=R_m^2 mod(n)$ at 322 and sends the resultant value to the microprocessor 450, where n is a large predetermined composite number (a product of large prime numbers). The microprocessor 450 stores X data received in the internal RAM at 303.

A random number $B_m$ is generated at 304, where $B_m$ is a value of 0 or 1. At 305, the data of $B_m$ is sent to the printer.

The microprocessor 460 carries out the processing at 326 when the value of $B_m$ received at 324 and 325 is 0 and the processing at 327 when the value of $B_m$ is 1.

At 326, the data of $Y=R_m$ is sent out to the image scanner. At 327, the value of $Y=TR_m mod(n)$ is sent out to the image scanner.

In this case, T is the confidential information owned only by the printer which has the identification signal addition function.

At 306, the microprocessor 450, which has received the above-described Y data, checks a validity of the value Y at 307 by the following formulae.

$$X=Y^2 mod(n) \text{ if } B_m=0 \quad (1)$$

$$ZX=Y^2 mod(n) \text{ if } B_m=1 \quad (2)$$

where X is a number stored in the RAM at 303 and Z is represented by $$Z=T^2 mod(n)(3).$$

If the Y data received is valid, the processing at 301 to 309 and 320 to 328 is carried out. Only when this processing is repeated 1 times and all of processing is normally completed, image data is transferred at 310 and 329.

If the Y data is invalid at 307, the microprocessor 450 stops after having displayed an error message shown in FIG. 4 at 308.

If the Y data received by the microprocessor 450 is invalid when this processing is carried out, the power supply of the image scanner should be turned on/off to reset the operation of the microprocessor.

(Patterning Circuit)

Figure 5:
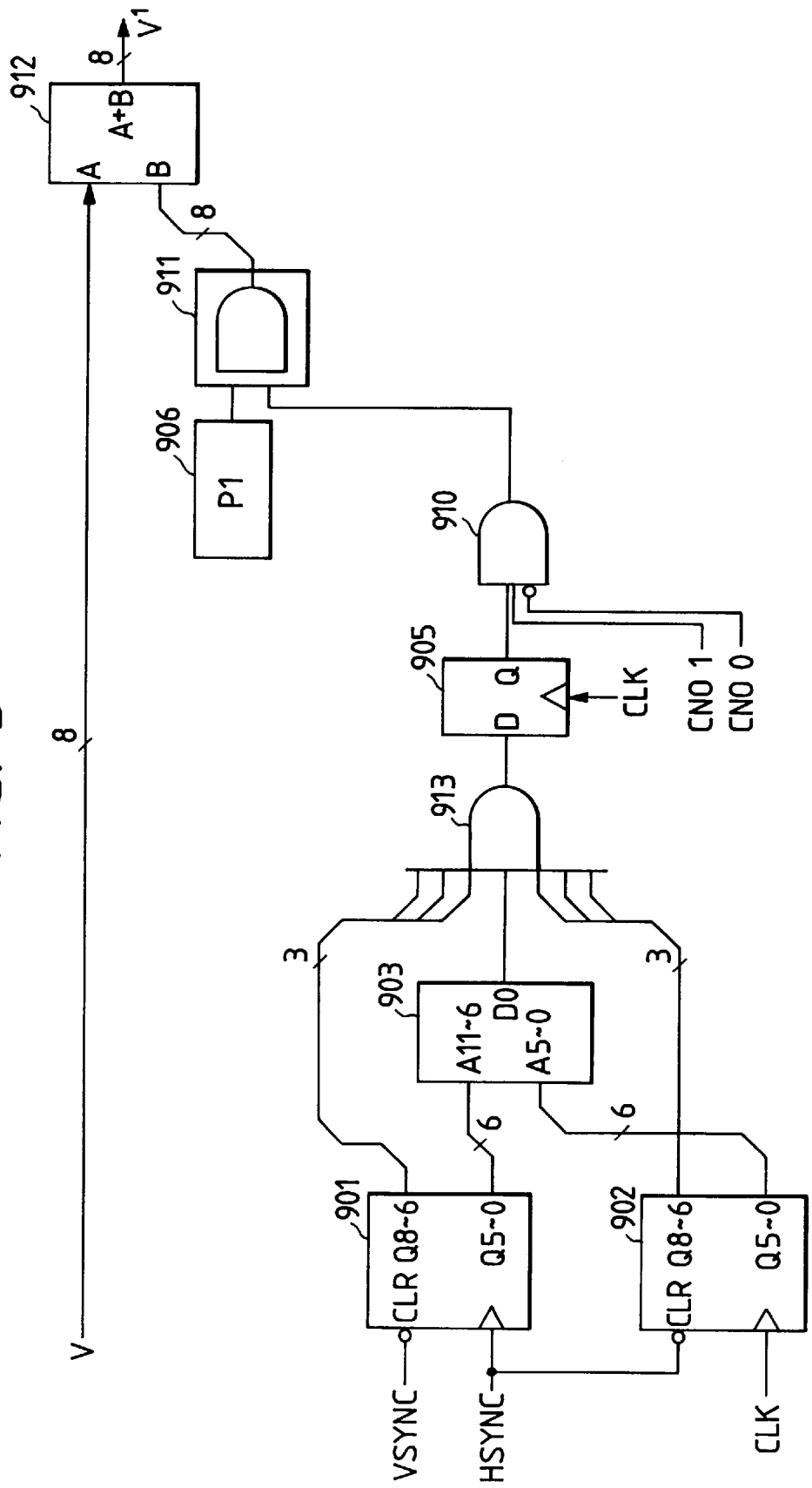
FIG. 5 is a block diagram showing a configuration of a patterning circuit 410 shown in FIG. 1.

FIG. 5 is a block diagram showing a configuration of the identification signal addition circuit 410 according to the embodiment. In FIG. 5, 901 is a sub-scan counter, 902 is a main scan counter, 903 is a look-up table ROM (hereafter referred to as the "LUT"), 905 is a flip-flop, 913 is an AND gate, 906 is a register, 910 is a 4 to 1 selector, 911 is an AND gate, and 912 is an adder, respectively.

The sub-scan counter 901 repeatedly counts main scan sync. signals HSYNC and the main scan counter 902 repeatedly counts pixel sync. signals CLK, respectively in a 9-bit width and 512 cycles. In addition, the LUT 903 is a read only memory (hereafter referred to as the "ROM") in which a pattern to be added is stored, and each lower 6 bits of respective counted values of the sub-scan counter 901 and the main scan counter 902 are entered into the LUT 903. Only one bit of the output of the LUT 903 is referred to, an AND value of the respective upper three bits of the main scan counter 901 and the sub-scan counter obtained by an AND gate 913, synchronization is performed with a CLK signal at the flip-flop 905, a logic operation of 2-bit plane sequential signals CNO "0" and CNO "1" is executed at the AND gate 91, and the result is sent to the gate 911. This is a signal which is valid only in the current printing in yellow (Y) with CNO=2 (refer to Table 1).

On the other hand, a value P1 is maintained in the register 906. Data which has passed through the AND gate 913 is added to an adder 912 as a pattern after an AND value with PI has been obtained by the AND gate 911. A result V' of addition is outputted from the adder 912. Accordingly, when printing is carried out with CNO=2, that is, in yellow, a pattern stored in the LUT 903 is repeatedly read out and added to the signal V to be outputted.

In this case, the pattern is added only with a yellow toner so that it is difficult to identify the pattern or the pattern cannot be identified by human eyes. This utilizes the fact that the human eyes are weak in identification of a pattern drawn with the yellow toner.

(Result of Copying)

Figure 6:
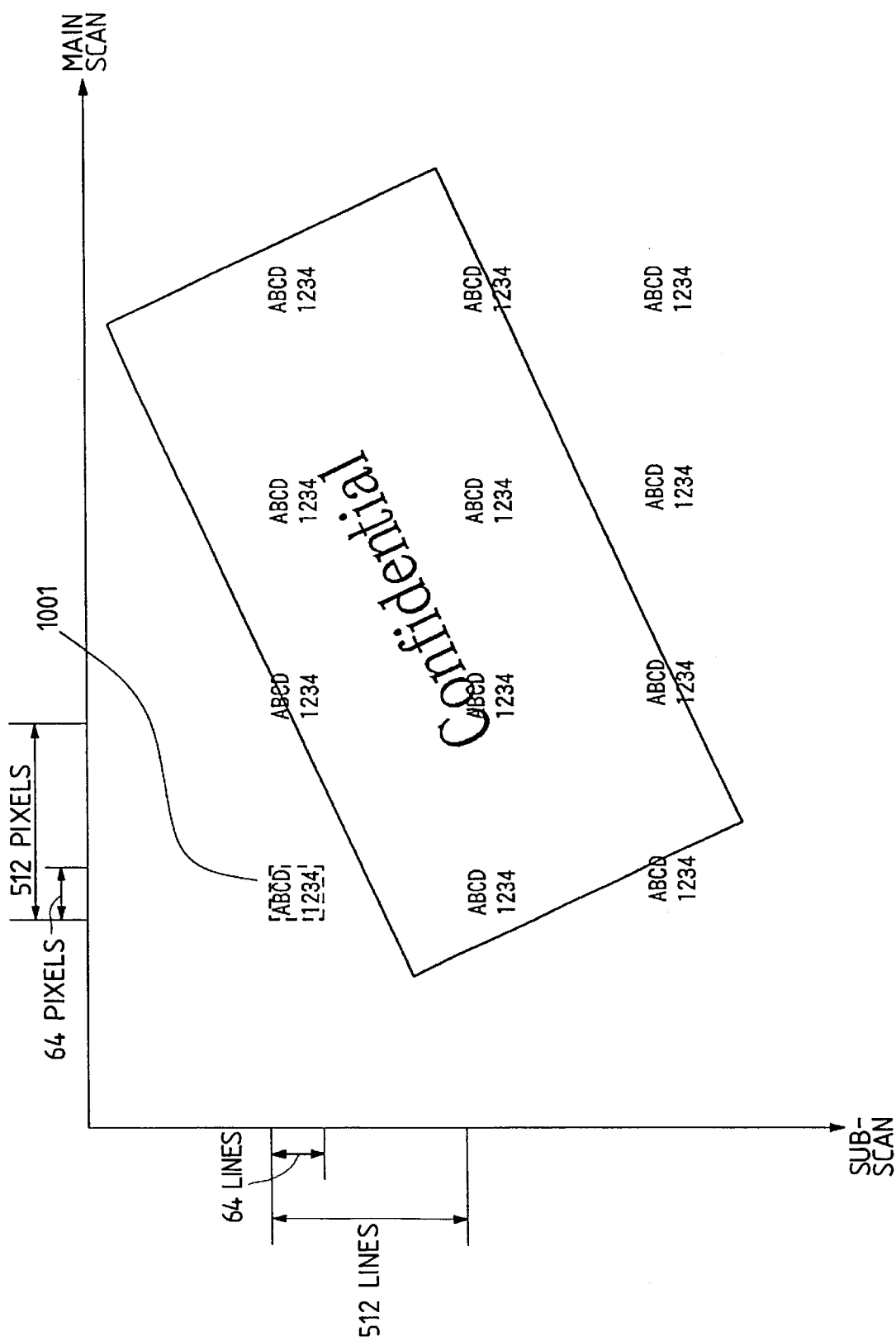
FIG. 6 is an example of a copying print.

FIG. 6 shows an example of a result of copying according to the first embodiment. In FIG. 6, the added pattern is shown with 1001 and the contents stored in the LUT 903 is the added pattern. In the example shown in FIG. 6, a pattern to which "ABCD" and "1234" are arrayed in the sub-scan direction is added as a pattern of 64 pixels×64 pixels so as to be difficult to identify with human eyes and scanning is repeated for every 512 pixels for main scanning and 512 lines for sub-scanning. Therefore the copying machine used can be limited by judging a copied matter to which the pattern is added if the pattern is made as a specified serial number or a specified encoded serial number of the machine.

Moreover, in a case that there is a high possibility of a specified original, which should not primarily be copied, included in an image to be read, a pattern varying in the density such as a high density can be added in accordance with a probability of a specified original.

In addition, in this embodiment, a pitch for adding the pattern is specified to be 512 pixels (or lines) for the main scanning and therefore the pattern is added for every approximately 32.5 mm since the resolution is specified to be 400 dpi (dots/inch). On the other hand, the shorter side lengths of bank notes (issued by the Bank of Japan) are approximately 76 mm and the shorter side lengths of bank notes issued in the leading advanced countries are approximately 60 mm to 120 mm and therefore the pattern must be added to the copied matters of these bank notes if the bank notes are illegally copied. Accordingly, if a bank note or bank notes are copied on, for example, an A4 size paper and only copied bank notes are cut out for illegal use, and the serial number of the copying machine used can be specified by checking the copied matter and reading the added pattern.

Figure 7:
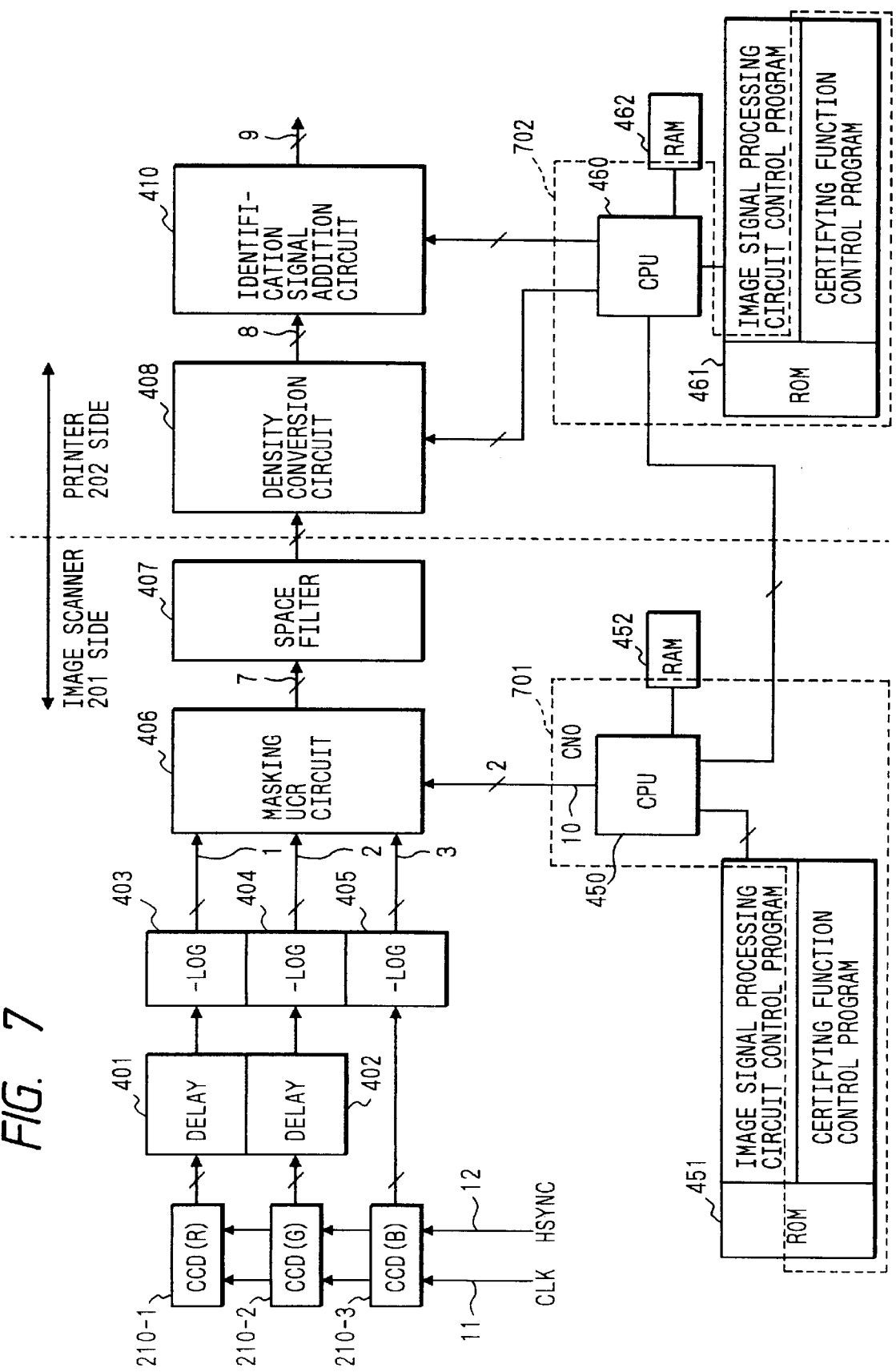
FIG. 7 is a block diagram showing the flow of signals through the image scanner 201 and the printer 202 of a second embodiment.

The configuration shown in FIG. 1 is intended to provide the equipment with a strength for improvement by adapting the equipment to carry out the certification processing and the control of the image signal processing circuit by one microprocessor. A second embodiment of the present invention is intended to perform a function which better prevents the illegal modification of the equipment than in the configuration shown in FIG. 1 by forming 701 and 702 parts shown in FIG. 7 with a single chip LSI.

If the ROM simultaneously incorporates the calculation part and the ROM stores the certification function control program in a single chip, a calculation processing for performing the certification processing cannot be traced from outside. If at least part of the image signal processing circuit control program is adapted to simultaneously exist in 701 or 702, the image signal processing circuit does not normally operate and an illegal modification of the certification processing part can be prevented even though the microprocessor in which an improved microprocessor is built in, is connected to actuated.

(Second Embodiment)

Figure 8:
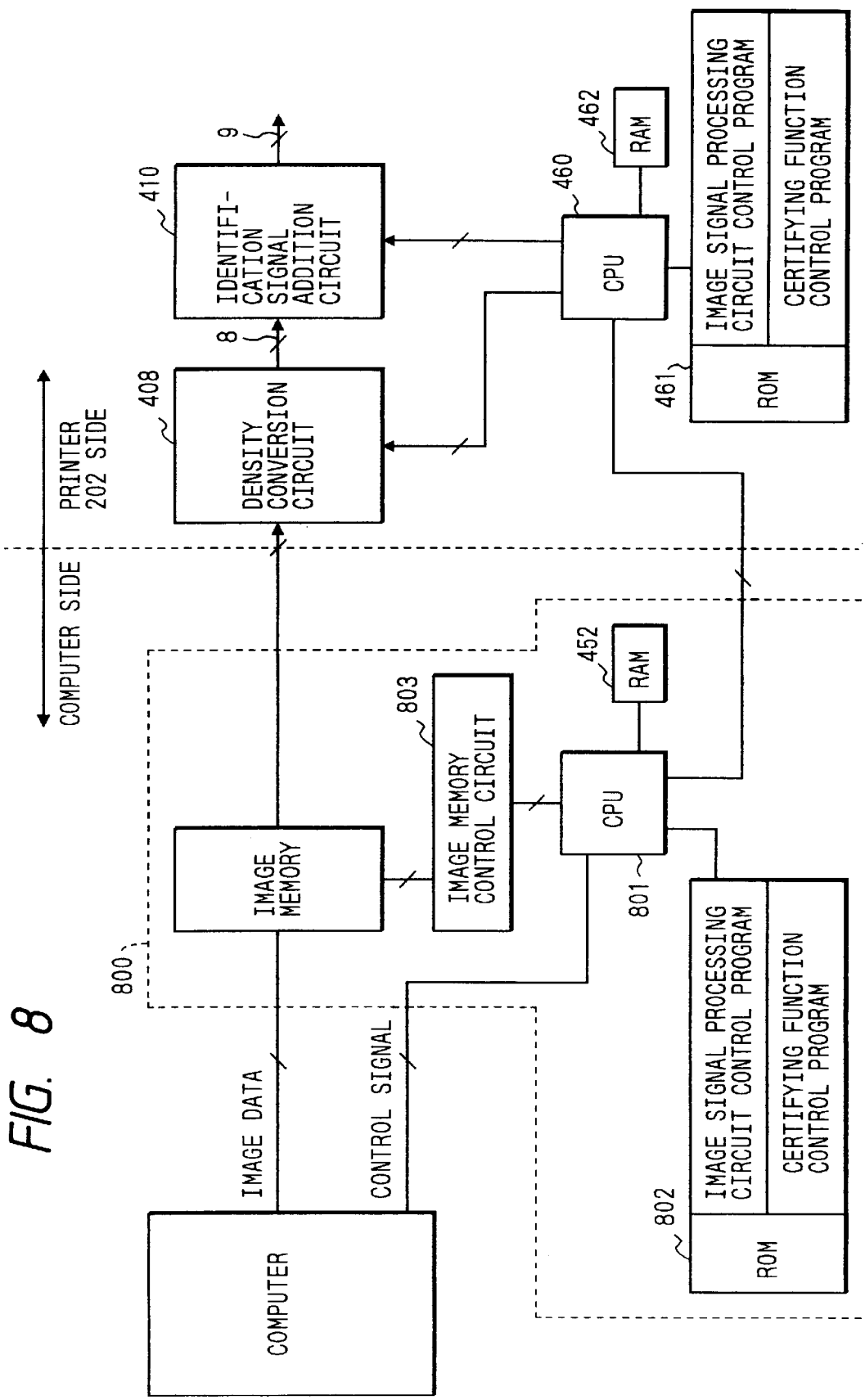
FIG. 8 is a block diagram illustrating the second embodiment.

FIG. 8 is a diagram illustrating a second embodiment of the present invention.

The first embodiment is adapted to transfer an image from the image scanner to the printer.

The second embodiment is intended to transfer an image from the computer to the printer.

In FIG. 8, 800 is, for example, an image memory device which receives image data from the computer and transfers it to the printer.

801 is a microprocessor which executes the certification operation of the image memory control circuit 803 and the printer 202.

The microprocessor 801 executes a processing equivalent to the certification operation of the microprocessor 450 shown in FIG. 1.

The second embodiment of the present invention described above is intended to certify that the identification information is added to the print when the image data is transferred from an electronic device which processes image data to the printer by providing the function for detecting whether the printer has a function for adding the identification information.

More specifically, a pass word (confidential) to be given only when the printer has a function for adding the identification information is certified by the so-called zero knowledge interactive method from external equipment and, only when the external equipment determines that the printer has the function for adding the identification information, the image data is transferred to the printer.

The above-described pass word can be certified without sending the pass word through the data transfer channel by using such means (zero knowledge interactive proof) and therefore a safe and accurate certification function can be realized.

An example of such certification is described by means of the zero knowledge interactive proof in the above embodiment and moreover the other cipher method (for example, an RSA method) can be used to certify that the printer has special confidential information.

Though the printer is described as an example of the image forming apparatus in this embodiment, a display can be used as the image forming apparatus according to the present invention.

As described above, the present invention enables one to have certainly that the identification information will be added to an image-formed matter by providing means for certifying from external equipment that the printer has the function for adding the identification information.

The system can be more resistant to tampering of the equipment by adapting the microprocessor to simultaneously serve as a microprocessor for controlling the image signal processing circuit.

The system which is highly resistant to illegal modification can be formed by the ROM for storing a program to execute the certifying operation and the microprocessor as a single-chip LSI.

A third embodiment of the present invention is described below.

(Signal Processing Block Diagram)

Figure 9:
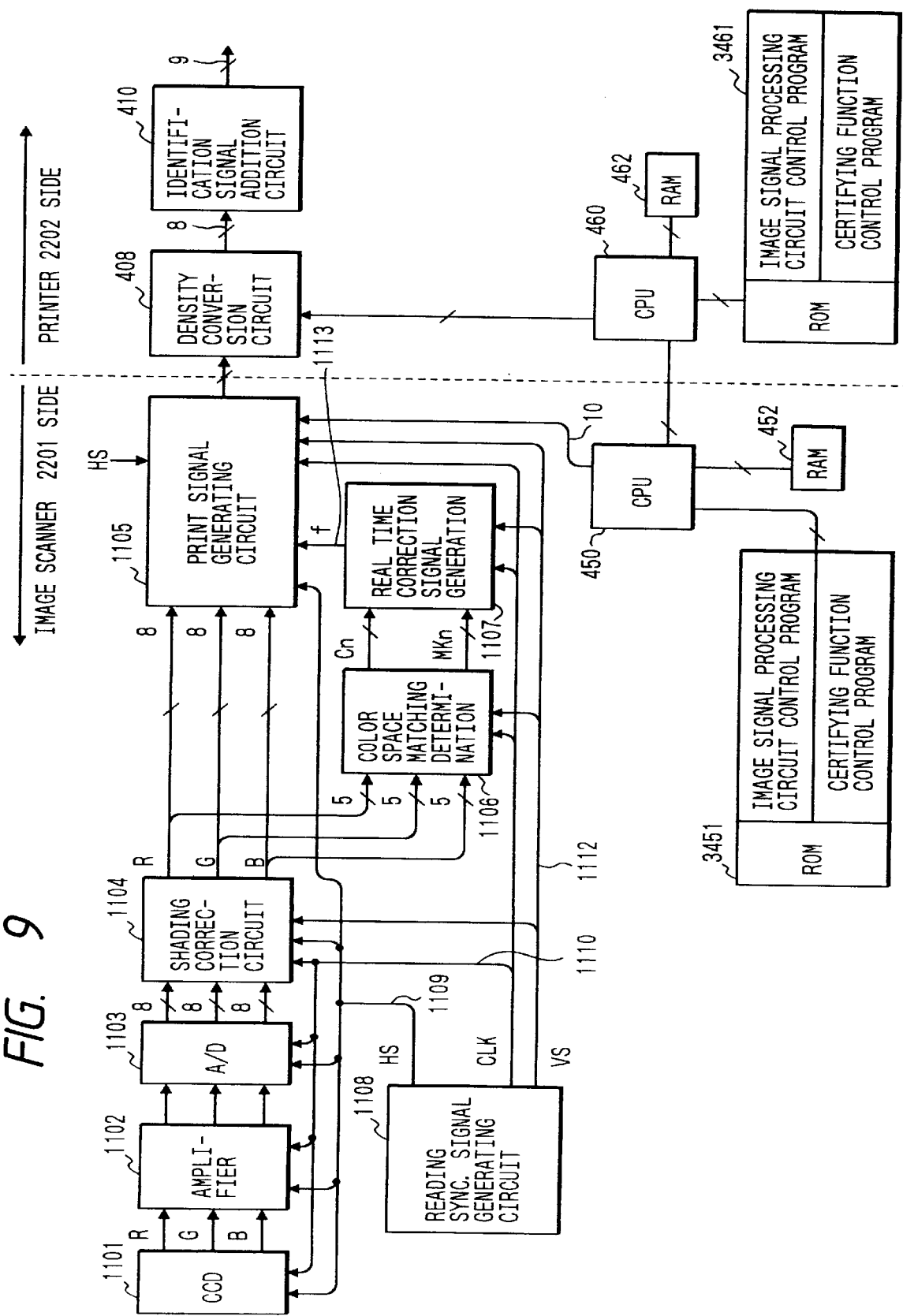
FIG. 9 is a signal processing block diagram of an image scanner 2201 and a printer 2202.

FIG. 9 is a signal processing block diagram of the image scanner 2201 and the printer 2202.

In FIG. 9, 1101 is a CCD color sensor, 1102 is an analog amplifier, 1103 is an A/D converter, and 1104 is a shading correction circuit which corrects variations of the lightness depending on a reading position for image signals.

1106 is a color space matching determination circuit for calculating in real time the similarity of color distributions in the 3-dimensional color space including the image data which has been read and a specified original such as a bank note or a security note.

Distortions of the lightness and color depending on the position of the original are corrected by using color signals which have been corrected for shading and, therefore, the similarity of color components in the color space can be accurately determined. The shading correction circuit 1104 for the color image reader is not described in detail here since it is known.

1105 is a print signal generating circuit which converts input color signals R (red), G (green), and B (blue) to Y (yellow), M (magenta), C (cyan) and Bk (black) signals. This circuit includes delay means for compensating for a time required for the determination described later. Print signals are modulated with a real time correction signal f1113.

1107 is a circuit for generating the real time correction signal f1113.

1108 is a circuit block for generating read sync. signals HS1109, CLK1110, and VS1112. HS1109 is a main scan range signal, CLK1110 is a pixel read reference clock signal, and VS1112 is a range signal which shows an effective range in the sub-scan direction for reading the original.

The density conversion circuit 408, the identification code addition circuit 410, the microprocessors 450 and 460, and RAMs 452 and 462 are of the same structure as those circuits described in FIG. 1. However, the contents of the program for ROMs 3451 and 3461 differ from those in FIG. 1 in order to carry out a processing according to this embodiment.

Figure 10:
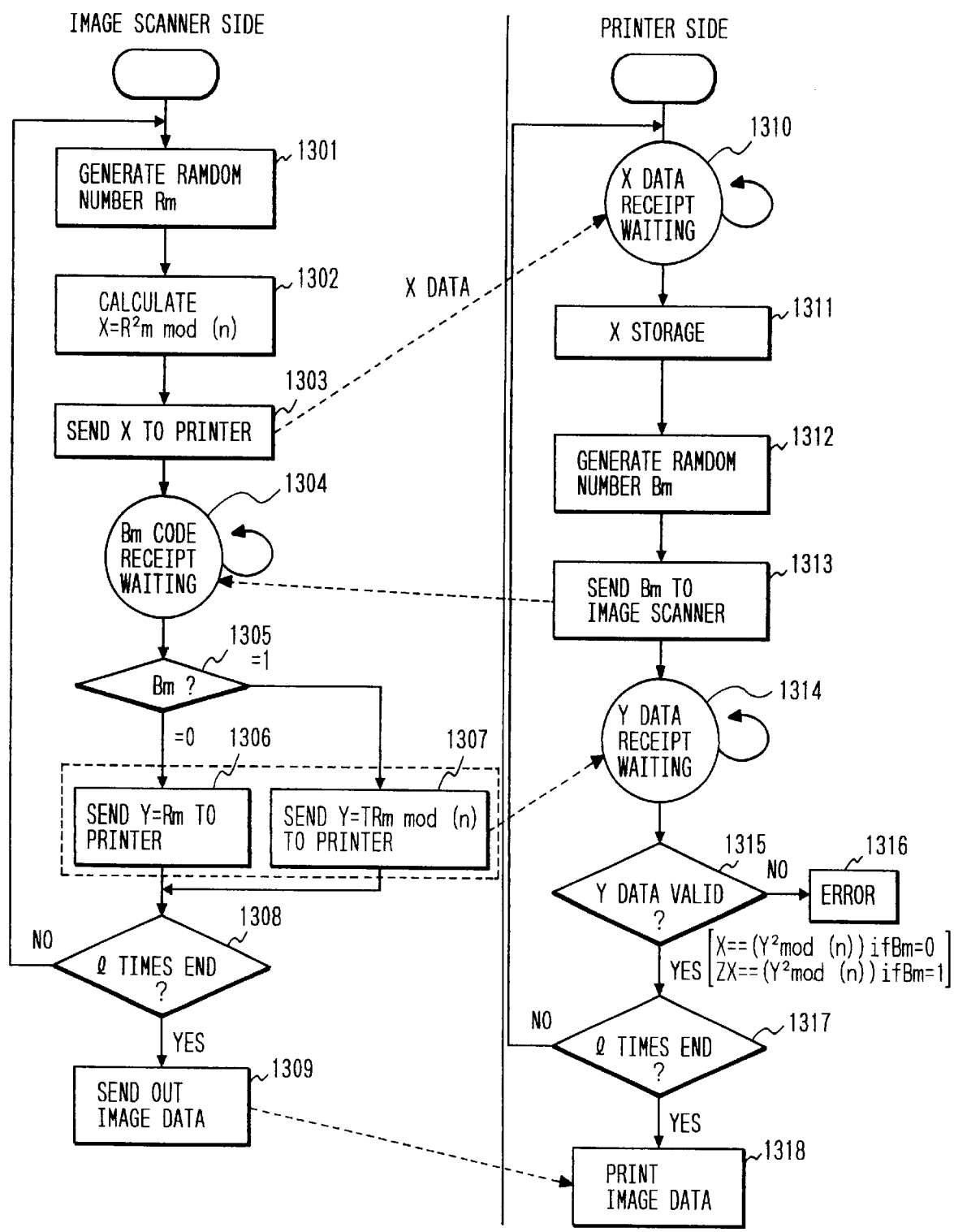
FIG. 10 is a flow chart illustrating a third embodiment.

FIG. 10 is a flow chart which illustrates the processing where the printer 2202 certifies that the image scanner 2201 has the specified original determination function.

In this processing, the certification function is implemented by adapting the printer to confirm that only the image scanner having the specified original determination function maintains the confidential information T.

In this case, it can be confirmed that the image scanner 2201 has the confidential information T without loading the confidential information T of the transfer channel by using the means of zero knowledge interactive proof as in the first embodiment and therefore the certifying operation can be implemented in safety.

The flow chart shown in FIG. 10 shows a flow of operations of the microprocessor 450 of the image scanner 2201 and the microprocessor 460 of the printer 2202 in certification processing.

The microprocessor 450 of the image scanner 2201 generates a random number Rm at 301, calculates $X=Rm^2 mod (n)$ at 302 and sends out it to the microprocessor 460 of the printer 2202.

In this case, n is a large predetermined composite number (a product of large prime numbers).

The microprocessor 460 stores X data received at 1310 in the internal RAM at 1311, and generates the random number Bm at 1312.

Bm in this case is 1-bit data, that is, a value of 0 or 1.

The microprocessor 450 which sends out the data of Bm to the image scanner at 1313 carries out the processing at 1306 when the Bm values received at 1304 and 1305 are 0 and the processing at 1307 when the Bm values are 1.

Data of Y=Rm is sent out to the printer at 1306 and the value of Y=TRm mod (n) to the printer at 1307.

In this case, T is confidential information to be given only to the image scanner which has the specified original determination function.

The microprocessor 460 which has received the above-described Y data at 1314 checks the validity of the value Y by using the following formulae (1) and (2).

$$X=Y^2 mod(n) \text{ if } Bm=0 \quad (1)$$

$$ZX=Y^2 mod(n) \text{ if } Bm=1 \quad (2)$$

where, X is a number stored in the RAM at 1311 and Z is $$Z=T^2 mod(n) \quad (3)$$

Even though the Y data received is determined valid, the certification can be more certainly carried out by carrying out the processing specified at 1301 to 1308 and 1310 to 1317 as many times as specified (1 times). It is determined that the image scanner 2201 has the specified original determination function only when the above processing has been normally finished 1 times, and the image data is transferred at 1309 and 1318.

If the Y data is invalid at 1315, the microprocessor 460 stops after the error message shown in FIG. 11 has been displayed at 1316.

The microprocessor 460 is stopped by carrying out this processing when the Y data received by the microprocessor 460 is invalid and therefore the power supply of the printer 2202 should be turned on or off to reset the operation of the microprocessor 460.

(Color Space Matching Determination Circuit 1106)

Figure 12:
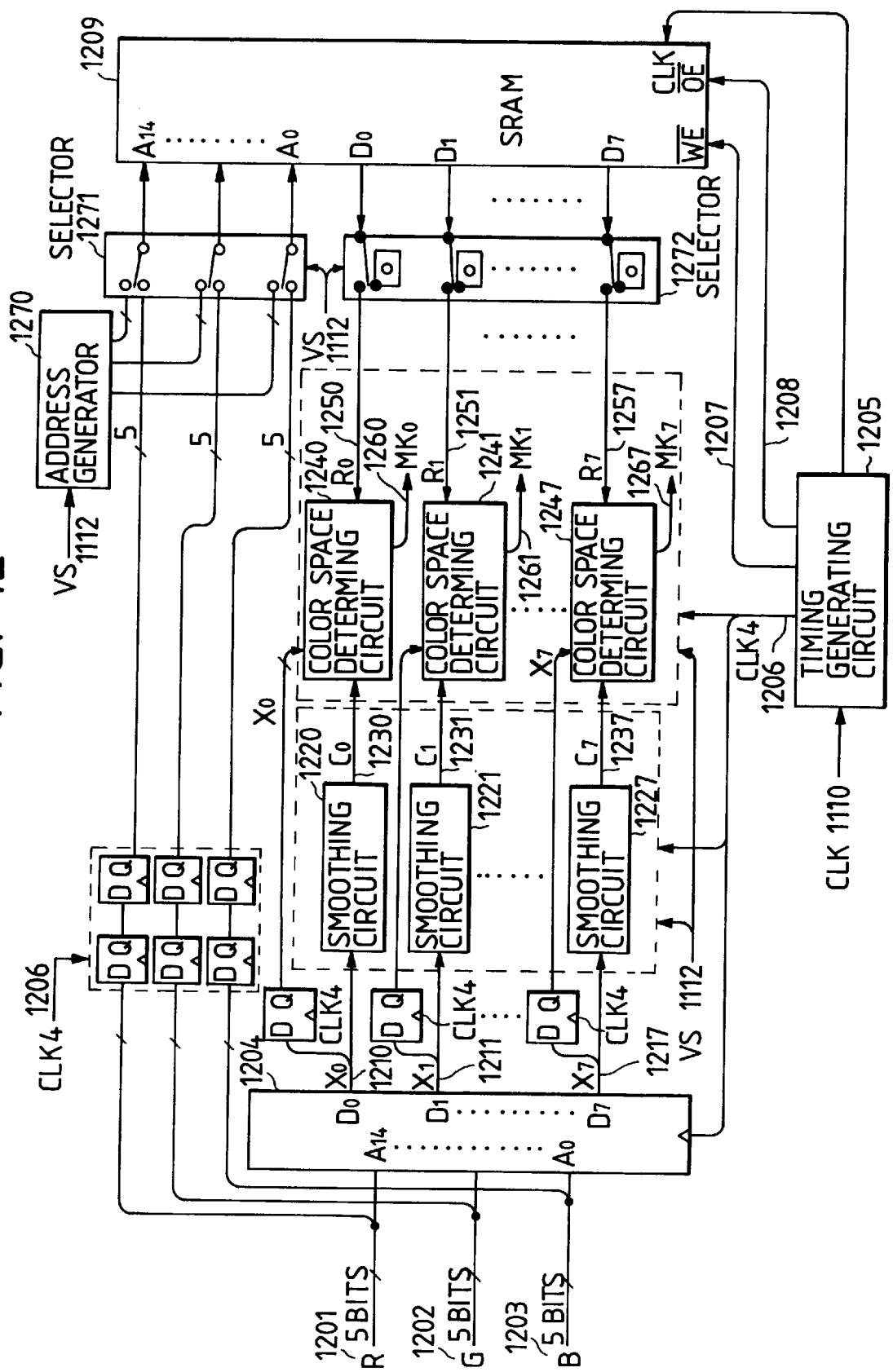
FIG. 12 is a circuit diagram of a color space matching determination circuit.

FIG. 12 illustrates the color space matching determination circuit 1106.

In FIG. 12, R1201 is the data of the upper five bits of eight bits of the R (red) signal from the shading correction circuit 1104. Similarly, G1202 is a 5-bit G (green) signal and B1203 is a 5-bit B (blue) signal.

Figure 20:
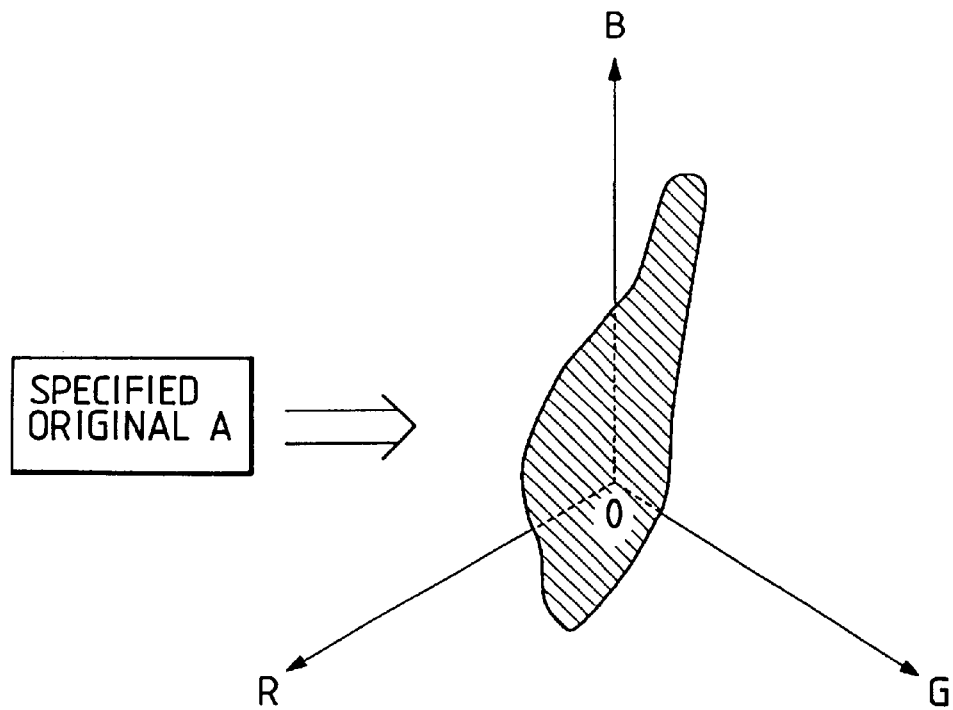
FIG. 20 is an illustration showing a shape of a specified original A in a color space.
Figure 21:
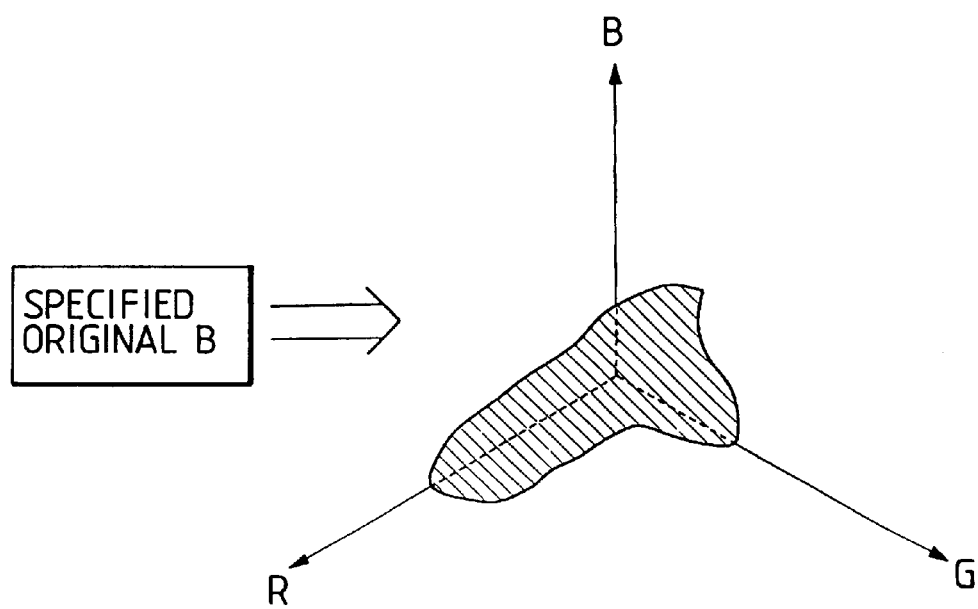
FIG. 21 is an illustration showing a shape of a specified original B in a color space.

1204 is a ROM (read only memory) which stores the information related to colors of a plurality of types of specified originals. Colors of the specified originals carry particular color distributions on the color spaces, depending on the type of specified original, as shown in FIGS. 20 and 21. The ROM 1204 operates to enter the R, G and B signals into addresses $A_0$ to $A_{14}$ and outputs the determination signals which indicate that the R, G and B signals entered coincide with the colors of the plurality of types of specified originals to data $D_0$ to $D_7$.

Figure 19:
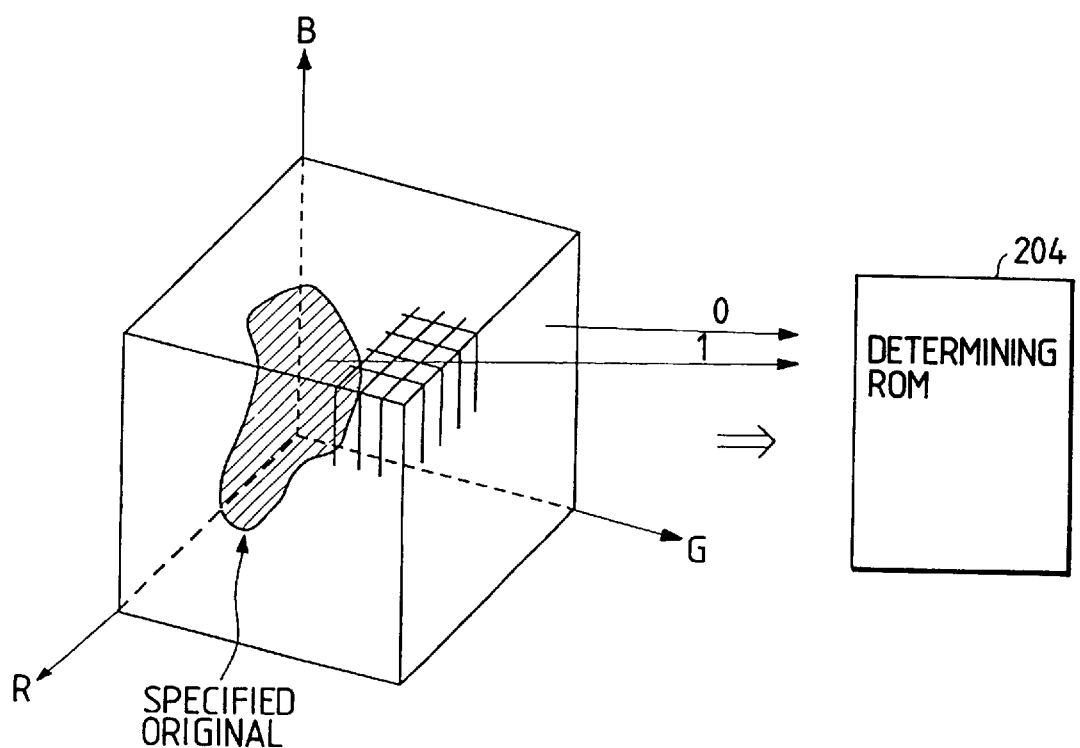
FIG. 19 is an illustration showing a relationship between a shape of a specified original in a color space and a determining ROM 1204.

The information related to the colors of the specified originals is stored in the data of the ROM 1204 as shown in FIG. 19 and 1 is outputted to $D_0$ to $D_7$, respectively, when the signals coincide with the colors of the specified original and 0 is otherwise outputted. $D_0$ to $D_7$ correspond to eight types of specified originals of the 0th to 7th specified originals.

Figure 22:
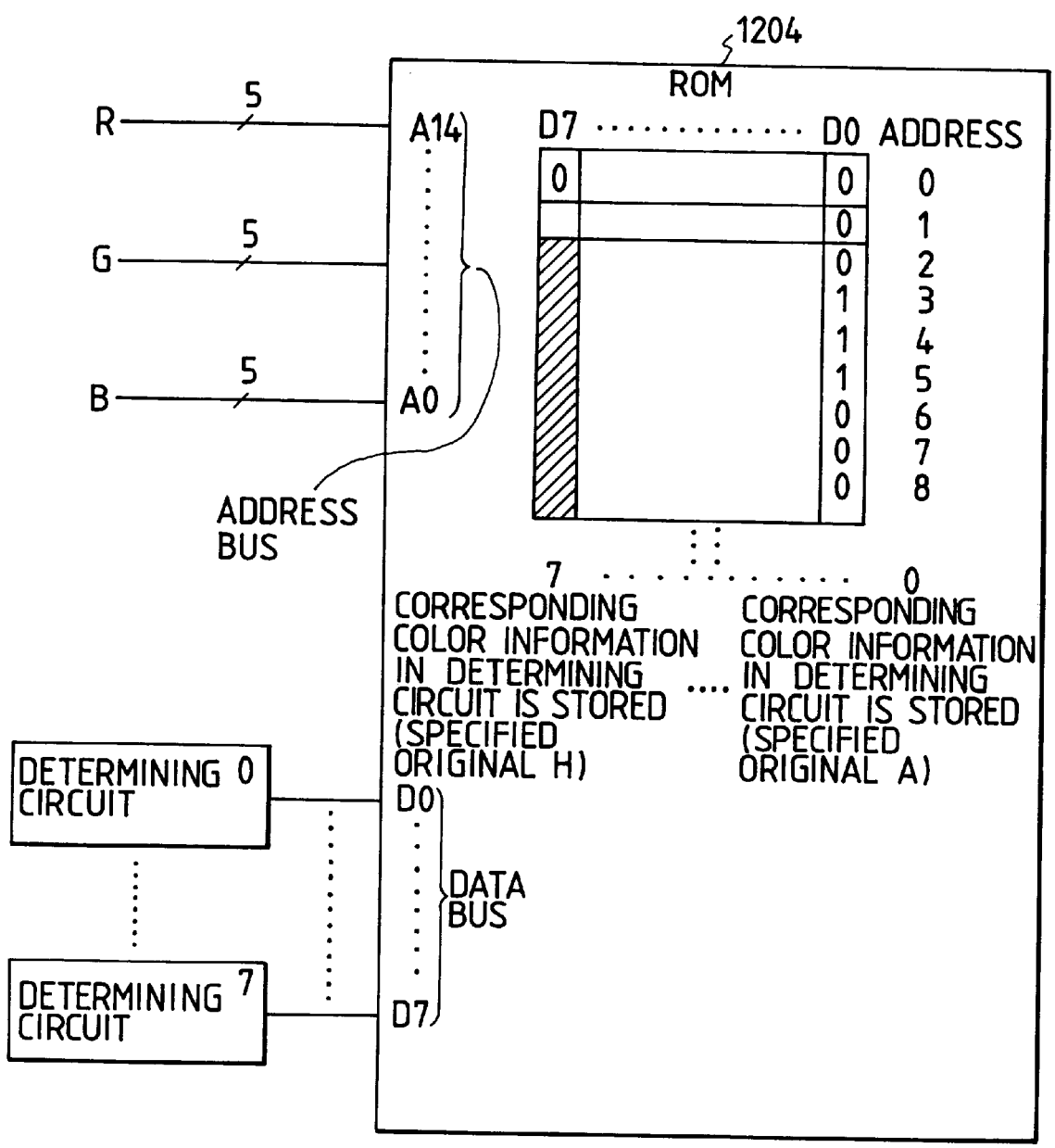
FIG. 22 is an illustration showing a relationship between data of a plurality of originals stored in the determining ROM 1204 and the bit positions of the determining ROM 1204.
Figure 23:
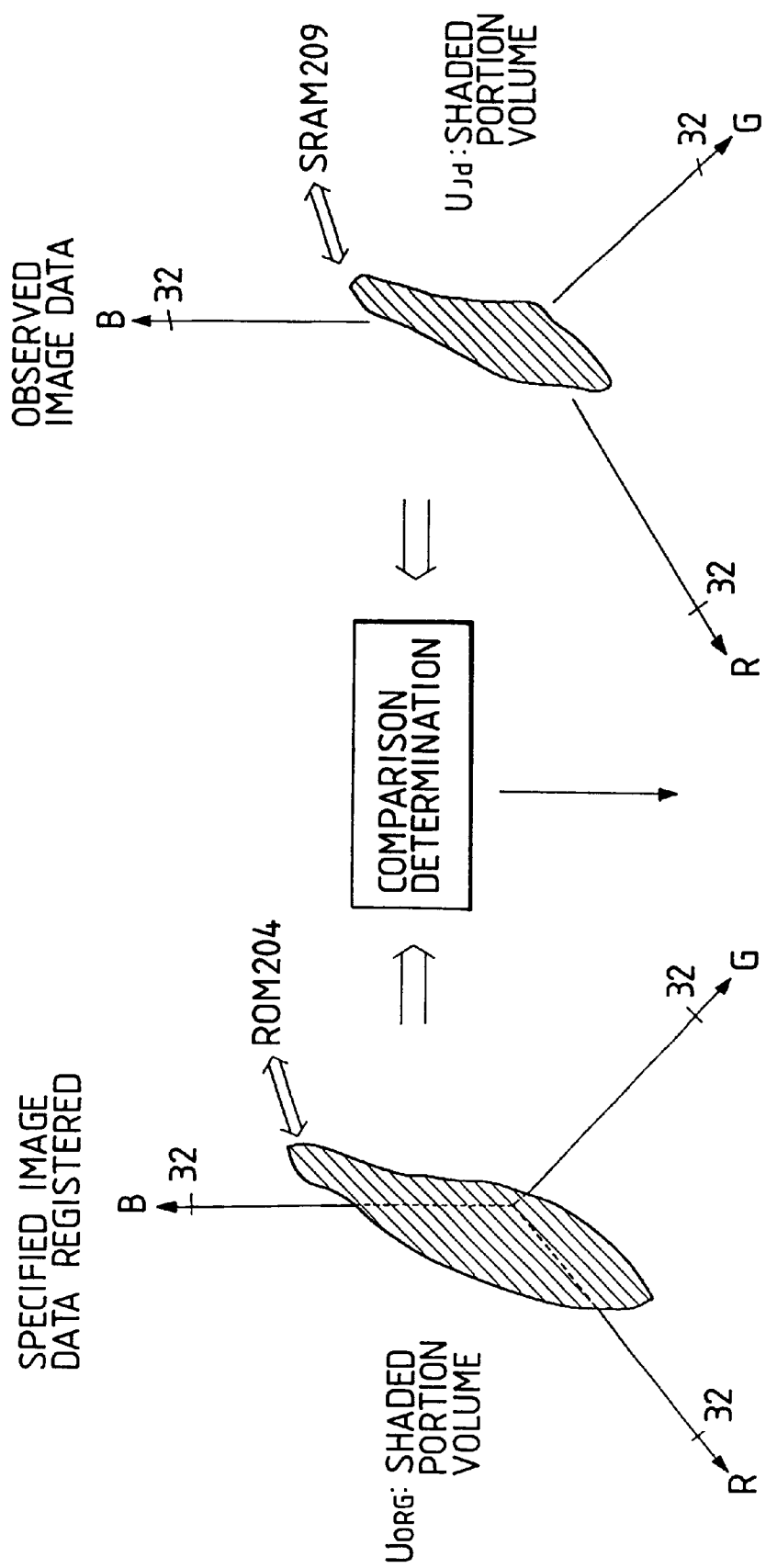
FIG. 23 is an illustration showing a conceptional representation of the determination of a similarity of a distribution of an input color image in a color space and a color distribution of specific original.

FIG. 22 shows a relationship between the data related to the colors of the plurality of types of originals stored in the ROM 1204 and the bit positions of the ROM 1204. Determining information related to the colors of eight different types of specified originals is outputted in parallel from $D_0$ to $D_7$ to the pixel data entered.

Figure 17:
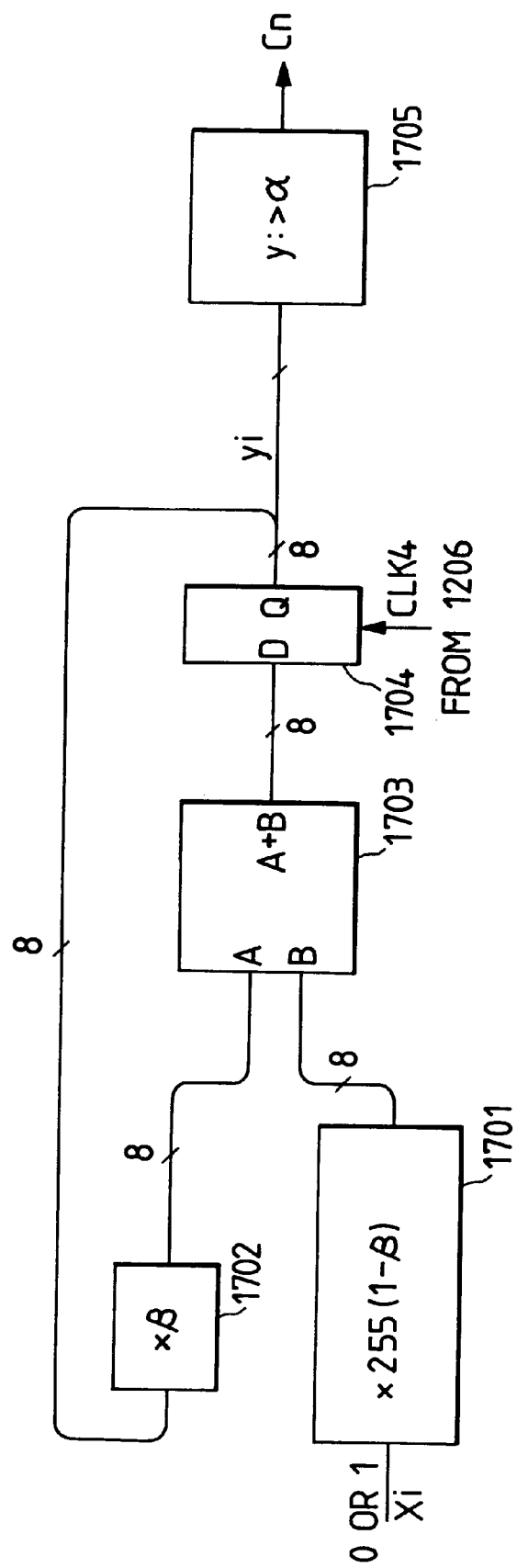
FIG. 17 is a circuit block diagram showing circuit configurations of smoothing circuits 1220 to 1227.
Figure 18:
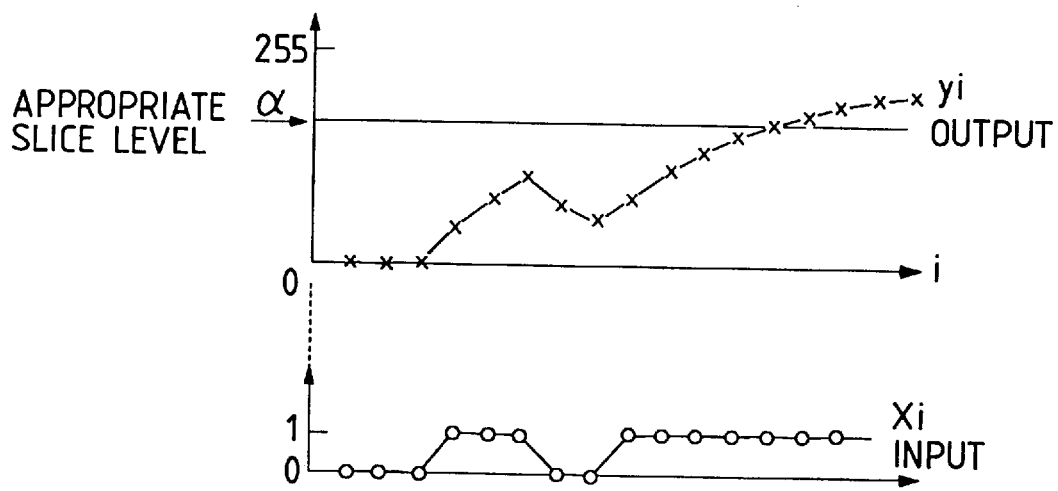
FIG. 18 is graphical representations respectively showing a relationship between an input Xi and a smoothing calculated value Yi.

Smoothing circuits 1220 to 1227 carry out the smoothing operation shown in FIGS. 17 and 18 by using color determination signals $X_0 210$ to $X_7 217$.

FIG. 17 is a circuit block diagram showing the configuration of one of smoothing circuits 1220 to 1227.

In FIG. 17, 1701 and 1702 are respectively a multiplier, 1703 is an adder, 1704 is a latch circuit, and 1705 is a comparator. A specified original as shown in FIG. 18 can be determined in conjunction with the continuity of data by using a weighted mean of input data and the preceding data of multipliers 701 and 702 and the adder 703 for such a determination.

FIG. 18 shows a relationship between input Xi and smoothed value Yi. If 1 continues as a value of input Xi, the value of Yi increases.

When input R, G and B signals continuously coincide with the colors of the specified original, signals 1230 to 1237 become 1 and a more accurate determination can be made without being affected by noise and other factors.

Figure 16:
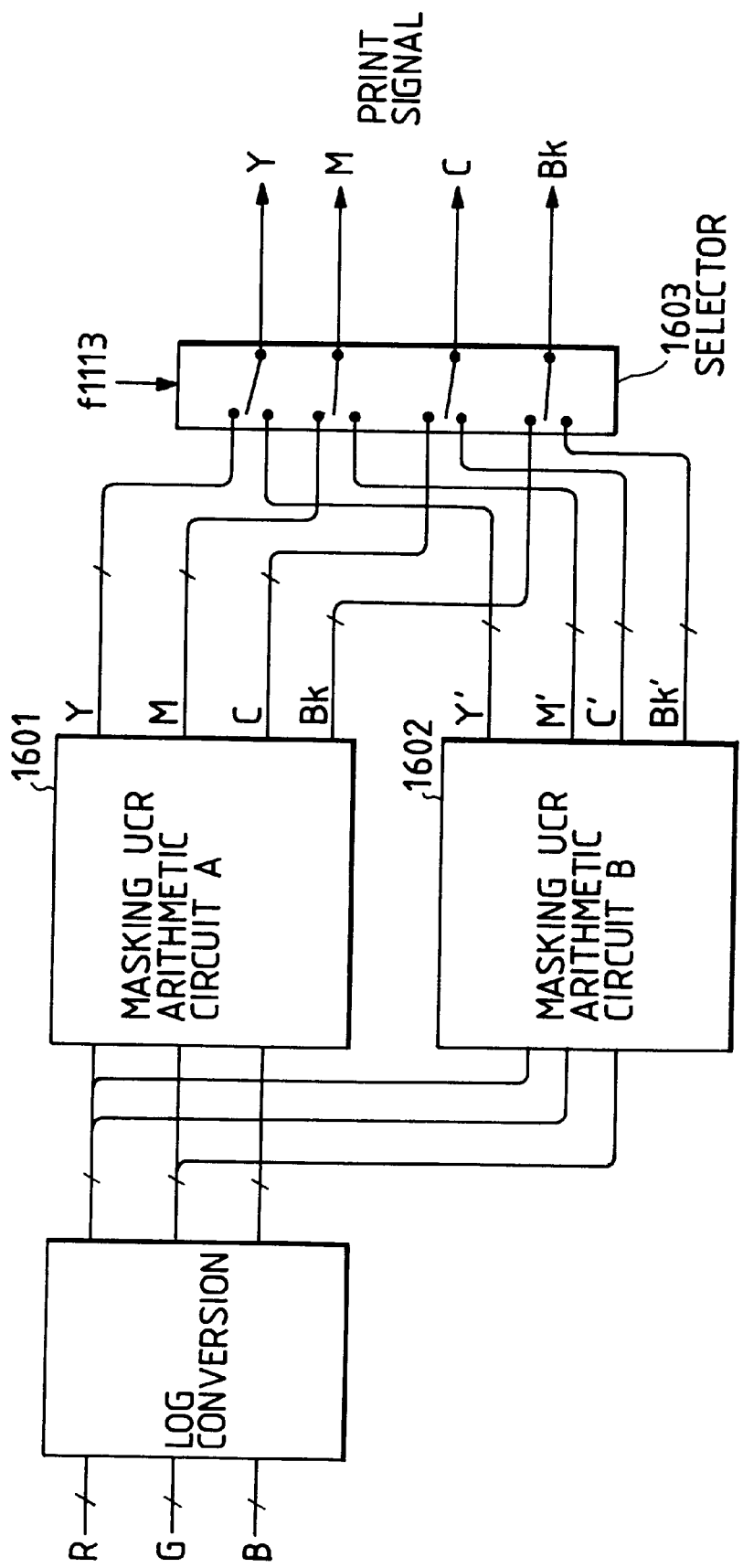
FIG. 16 is a cricuit block diagram of a print signal generating circuit 1105.

In the color space determination circuits 240 to 247, the similarity of the specified image data and the input color signals in R, G and B color spaces shown in FIG. 16 is calculated in real time and color space similarity determination signals $MK_0 260$ to $MK_7 267$ are calculated.

Figure 13:
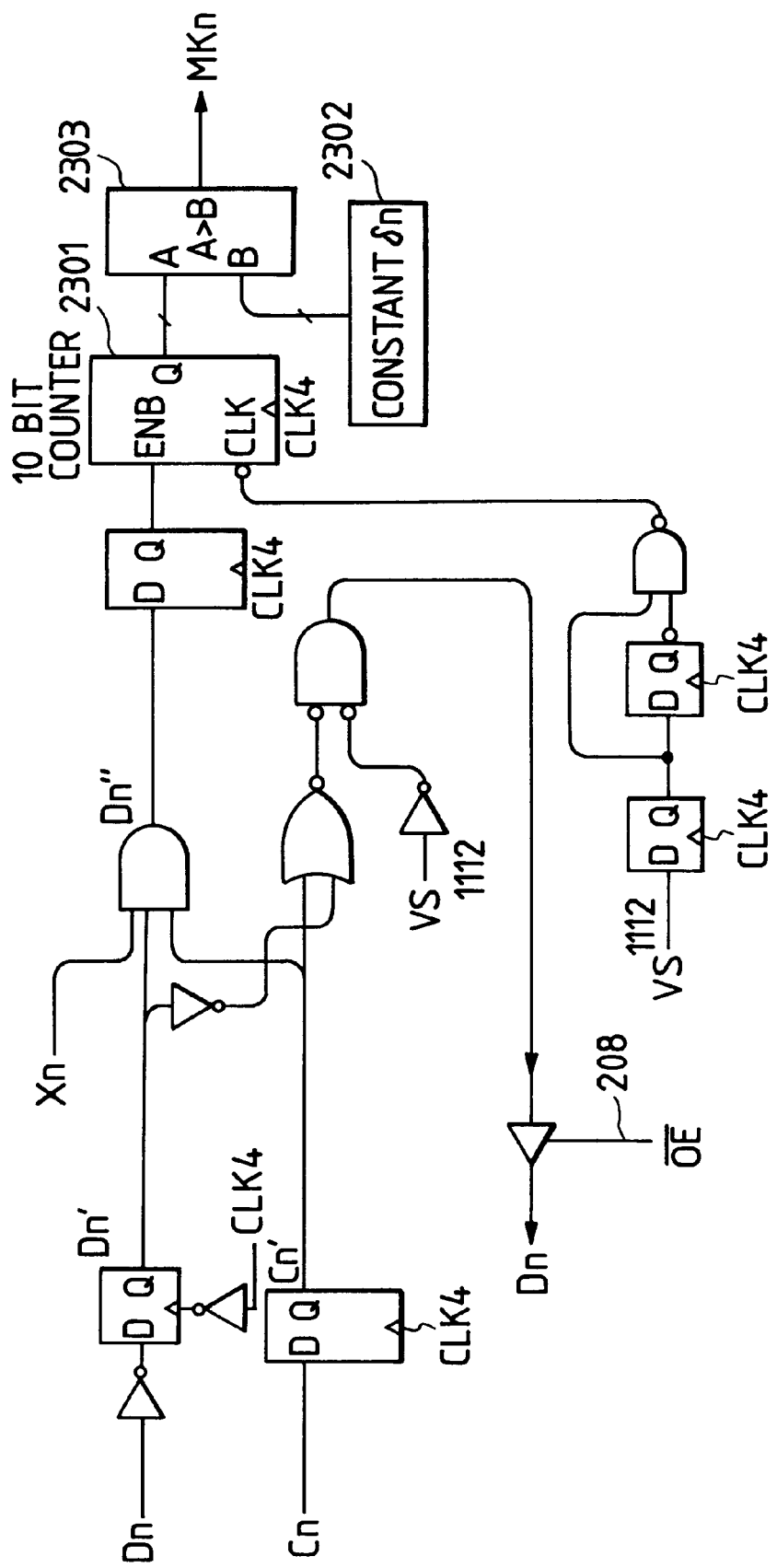
FIG. 13 is a circuit block diagram of color space determination circuits 240 to 247.

FIG. 13 is a block diagram of one of color space determination circuits 1240 to 1247.

In this circuit configuration, data Dn from the SRAM 1209 and a signal Cn from the smoothing circuit are OR-calculated and stored in the RRAM 1209. The counter 1301 is counted up only when data Dn is changed from 0 to 1. The counter 2301 is cleared at the rise of the sub-scanning range signal VS1112. An output value Zn of the counter 2301 and the constant $6n$ of the register 302 compared in the comparator 2303, MKn=1 is obtained at Zn>δn and MKn=0 at Zn≦δn. A value of 1% of $U_{ORG}$ in FIG. 16 is set as the value δn (1=90 in this embodiment).

$$\delta n = \frac{1}{100} \times U_{ORG} \quad (1)$$

In this case, $U_{ORG}$ is a value for a unit volume of a cube for which R, G and B coordinates are divided into 32 segments in FIG. 17.

When the observation image data, that is, the data of input color signal string have an approximately identical shape to the specified image data in R, G and B color spaces according to the above-described processing, the color space similarity determination signals $MK_0$ 1260 to $MK_7$ 1267 are set to 1.

Selectors 1271 and 1272 clear the SRAM 1209 when the sub-scan range signal VS1112 is 0 (LOW). An address generator 1270 generates in sequence all addresses of the SRAM1209. When the VS1112 is low, the SRAM1209 is cleared to 0 according to the addresses signals generated by the address generator 1270.

Figure 14:
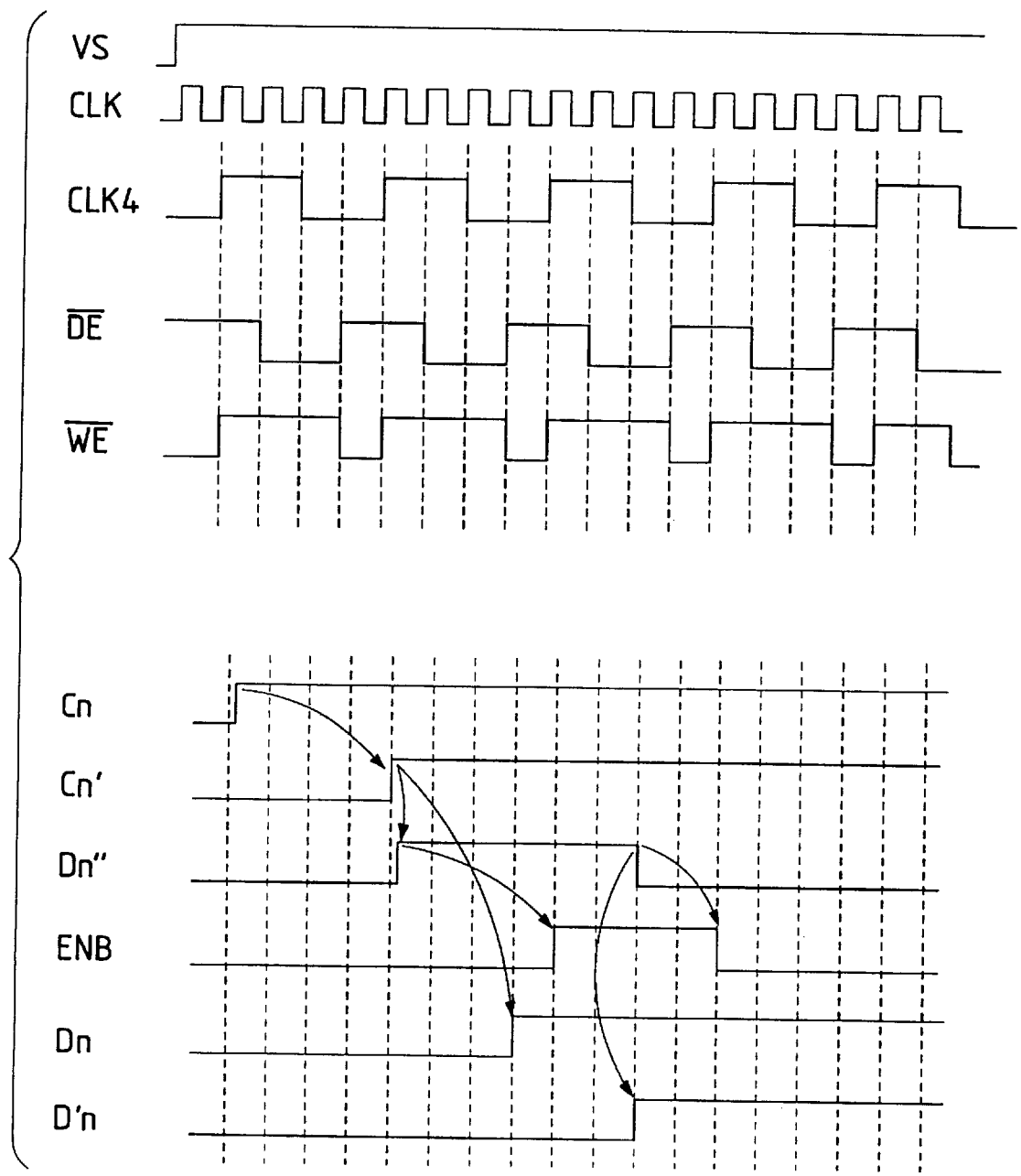
FIG. 14 is a timing chart.

1205 is a timing signal generation circuit which generates the timing signals shown in FIG. 14.

CLK4 at 1206 is a clock signal obtained by quarterly dividing the reference clock CLK1110, 1207 is a signal for controlling the write enable terminal of the SRAM1209 and 1208 is a signal for controlling the output enable terminal of the SRAM1209.

(Generation of Real Time Correction Signal)

Figure 15:
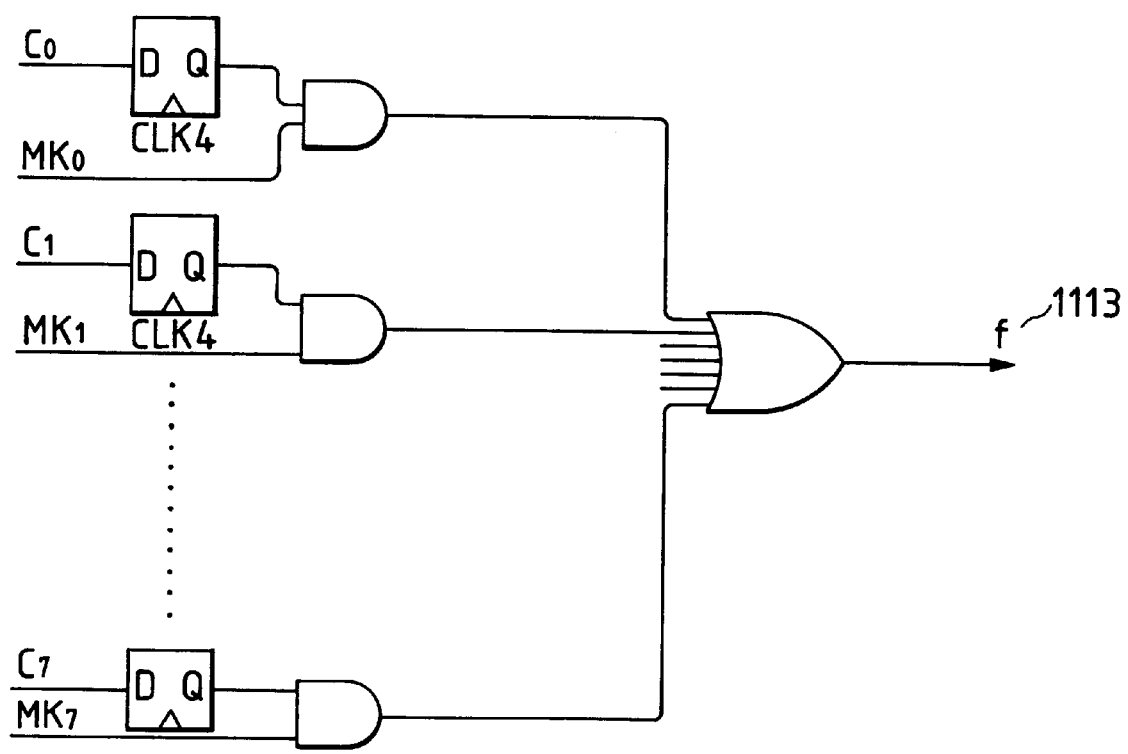
FIG. 15 is a circuit block diagram of a real time correction signal generation circuit.

FIG. 15 is a circuit block diagram which illustrates the real time correction signal generation circuit 1107.

When one of a plurality of specified original data registered in the ROM 1204 is determined to coincide with the observation image data on the color space according to this circuit configuration, the real time correction signal f1113 is set to 1 (High).

(Print Signal Generation Circuit)

FIG. 16 is a circuit block diagram which illustrates the print signal generation circuit 1105.

The masking UCR operation circuit A1601 usually generates the print YMCBk signals from R, G and B signals entered.

The masking UCR operation circuit B1602 generates print Y', M', C' and Bk' signals varying in color tones (for example, intensified red tone) if it is determined that the input color signals coincide with the specified original.

The color tone can be changed on the print only in the area where the color signals are determined to coincide with the specified original by selecting and outputting the signals of the circuits 1601 and 1602 by the selector 1603 according to the real time correction signal f1113.

In the above embodiment, the determination referring to the color tone is exemplified as a method for determining the specified original. Clearly, however, the other determination method such as pattern matching can be used. In addition, though the above embodiment is described using the image processing apparatus provided between the image scanner and the printer, it is obvious that the present invention is not limited to this embodiment and various types of systems including an image processing system which comprises an image input device such as a camera and an electronic device such as a monitor can be used.

Figure 24:
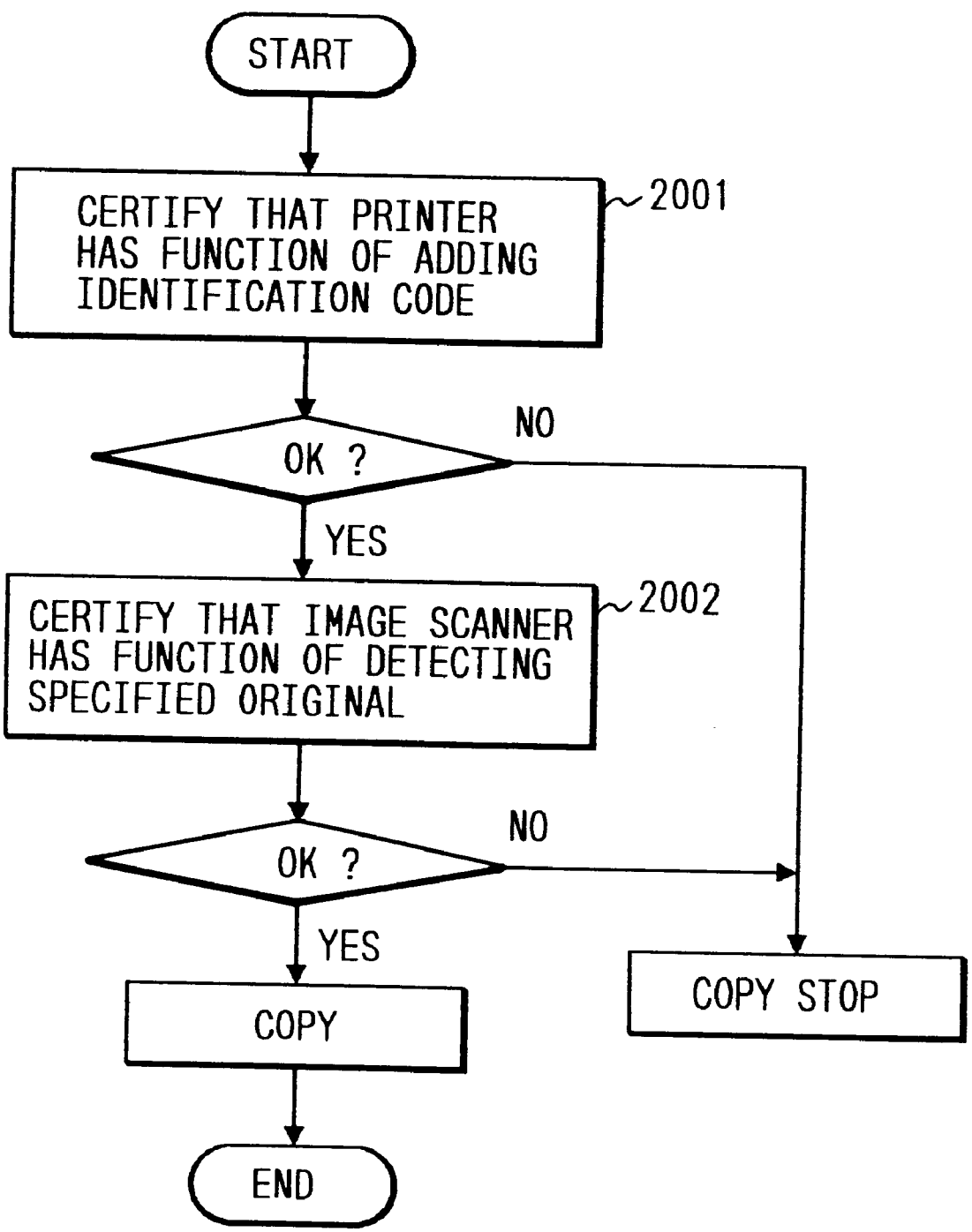
FIG. 24 is a flow chart illustrating a mutual certification operation.

FIG. 24 is a diagram illustrating mutual certification between the image scanner and the printer.

At 2001, the image scanner certifies for the printer that the image scanner has the identification code addition function.

At 2002, the printer certifies for the image scanner that the printer has the specified original detection function.

An illegal use of color image input/output equipment can be more certainly prevented by mutual certification between the input and output equipment. Thus the present invention enables to prevent vicious and illegal use of electronic equipment or image forming apparatuses by certifying whether the image input apparatus or the external apparatus has a special function.

In addition, certification is carried out between the image input and output apparatuses to determine whether these apparatuses are discretely provided with the special function and therefore vicious and illegal use of image processing apparatuses can be prevented which high accuracy.

What is claimed is:

1. An image processing system for transferring image data from an electronic apparatus to a destination image forming apparatus comprising:
   an electronic apparatus including:
      certifying means for certifying whether said destination image forming apparatus has means for adding identification information to an image, according to data received by said electronic apparatus from said destination image forming apparatus, and
      transfer means for transferring image data to said destination image forming apparatus when said certifying means certifies that said destination image forming apparatus has the means for adding identification information; and
   a destination image forming apparatus including:
      receiving means for receiving image data from said electronic apparatus, and
      adding means for adding the identification information to the image data received.

2. An image processing system according to claim 1, wherein said electronic apparatus is a computer.

3. An image processing system according to claim 1, wherein said electronic apparatus is a scanner.

4. An image processing system according to claim 1, wherein said destination image processing system is a copying machine.

5. An image processing system according to claim 1, wherein said data to be received comprises random numbers.

6. An image processing system according to claim 1, wherein said identification information is a serial number of said image forming apparatus.

7. An image processing system according to claim 1, wherein said identification information is added to an image so as to be identifiable with difficulty by human eyes.

8. An image processing system according to claim 1, wherein said adding means adds said identification information to an image with a yellow toner.

9. An electronic apparatus for transferring image data to a destination image forming apparatus, comprising:
   certifying means for certifying that said destination image forming apparatus has means for adding identification information to an image, according to data received by said electronic apparatus from said destination image forming apparatus; and
   transfer means for transferring said image data to said destination image forming apparatus when said certifying means certifies that said destination image forming apparatus has the means for adding identification information.

10. An image processing system according to claim 9, wherein said electronic apparatus is a computer.

11. An image processing system according to claim 9, wherein said electronic apparatus is a scanner.

12. An image processing system according to claim 9, wherein said data to be received comprises random numbers.

13. An image processing system according to claim 9, wherein said identification information is a serial number of said image forming apparatus.

14. An image processing system according to claim 9, wherein said identification information is added to an image so as to be identifiable with difficulty by human eyes.

15. An image processing system according to claim 9, wherein said adding means adds said identification information to an image with a yellow toner.

16. An electronic apparatus for transferring image data to a destination image forming apparatus, comprising:

image processing means for carrying out specified image processing of said image data; and certifying means for certifying that said destination image forming apparatus has means for adding identification information to an image, according to data received by said electronic apparatus from said destination image forming apparatus, wherein said image processing means and said certifying means are controlled by the same control means.

17. An image processing system according to claim 16, wherein said specified image processing is masking.

18. An image processing system according to claim 16, wherein said specified image processing is UCR.

19. An image processing system for transferring image data between a first electronic apparatus and a second electronic apparatus comprising:

a first electronic apparatus;

a second electronic apparatus;

first certifying means, in said first electronic apparatus, for certifying whether said second electronic apparatus has means for performing a first specified function;

second certifying means, in said second electronic apparatus, for certifying whether said first electronic apparatus has means for performing a second specified function; and processing means for transferring said image data between said first and second electronic apparatuses according to the result of certification obtained by said first and second certifying means.

20. An image processing system according to claim 19, wherein said first electronic apparatus is an image input apparatus.

21. An image processing system according to claim 19, wherein said second electronic apparatus is an image forming device.

22. An image processing system according to claim 19, wherein said first specified function is a function for determining whether an image entered by said first electronic apparatus is a specified image.

23. An image processing system according to claim 19, wherein said second specified function is a function for adding information to identify said second electronic apparatus to an output of said second electronic apparatus.

24. An image processing system according to claim 22, wherein said specified image is an image which should not be reproduced.

25. An image processing method in an image processing apparatus which outputs image data to a destination image formation apparatus, said method comprising the steps of:

certifying whether or not the destination image formation apparatus has a function to add information to the image data; and when it is certified that the destination image formation apparatus has the function to add the information to the image data, outputting the image data to the destination image formation apparatus.

26. A method according to claim 25, wherein the information to be added is number information of the destination image formation apparatus.

27. A method according to claim 25, wherein the information to be added is added in a form which is difficult or impossible to be identified by human eyes.

28. A method according to claim 25, wherein the information to be added is added by using yellow.

29. A method according to claim 25, wherein the image processing apparatus is a computer.

30. A method according to claim 25, wherein the image processing apparatus is a scanner.

31. A method according to claim 25, wherein the certified result is displayed.

32. An image processing method in a first image processing apparatus which receives image data from a second image processing apparatus, said method comprising the steps of:

certifying whether or not the second image processing apparatus has a function to identify whether or not an image is a specific image; and when it is certified that the second image processing apparatus has the identification function, receiving the image data identified by the identification function from the second image processing apparatus at the first image processing apparatus, wherein the identification function judges whether or not the image includes plural specific images.

33. A method according to claim 32, wherein the identification function identifies whether the image is the specific image, by performing color identification.

34. A method according to claim 32, wherein the identification function identifies whether the image is the specific image, by performing pattern identification.

35. A method according to claim 32, wherein the first image processing apparatus is a printer or a monitor.

36. A method according to claim 32, wherein the second image processing apparatus is a camera or a scanner.

37. A method according to claim 32, wherein the specific image is a banknote.

38. A processing method in an image processing apparatus which comprises means for identifying whether an image includes plural specific images and preventing, based on the identified result, outputting of an image faithfully representing the image, said method comprising the step of:

outputting, from the image processing apparatus to an external apparatus, information representing that the image processing apparatus has the means, wherein the means identifies whether the image includes the plural specific images by performing color identification.

39. A method according to claim 38, wherein there are plural specific images.

40. A method according to claim 38, wherein said means identifies whether said image is the specific image, by performing pattern identification.

41. A method according to claim 38, wherein the image processing apparatus is a camera or a scanner.

42. A processing method in an image processing apparatus which comprises means for adding information according to the image processing apparatus to image data received by the image processing apparatus from an external apparatus, said method comprising the step of:

outputting, from the image processing apparatus to the external apparatus, information representing that the image processing apparatus has said means for adding information, wherein the information to be added is added by using yellow.

43. A method according to claim 42, wherein the information to be added is number information of the image processing apparatus.

44. A method according to claim 42, wherein the information to be added is added to the image data in a form which is difficult or impossible to be identified by human eyes.

45. A method according to claim 42, wherein the image processing apparatus is an image formation apparatus.

46. A method according to claim 42, wherein the external apparatus is a scanner or a computer.

* * * * *

UNITED STATES PATENT AND TRADEMARK OFFICE
CERTIFICATE OF CORRECTION

PATENT NO.   : 6,621,922 B2
DATED        : September 16, 2003
INVENTOR(S)  : Yoichi Takaragi et al.

It is certified that error appears in the above-identified patent and that said Letters Patent is hereby corrected as shown below:

Column 1,
Line 16, "improvement" should read -- improvement of --.

Column 2,
Lines 9, 14 and 18, "further another" should read -- further --.

Column 4,
Line 4, "to add" should read -- adding --.

Column 5,
Line 64, "222," should read -- 219, --.

Column 6,
Line 12, "times" should read -- time --; and
Line 65, "pixelsx64" should read -- pixels x 64 --.

Column 7,
Line 39, "to" should read -- to be --.

Column 9,
Line 58, "times)." should read -- time). --.
Line 61, "times," should read -- time, --.

Column 12,
Line 11, "which" should read -- with --.

Signed and Sealed this

Thirteenth Day of January, 2004

JON W. DUDAS
*Acting Director of the United States Patent and Trademark Office*